United States Patent
Hori et al.

(10) Patent No.: US 9,167,678 B2
(45) Date of Patent: Oct. 20, 2015

(54) SYSTEM AND METHOD FOR GENERATING EXTREME ULTRAVIOLET LIGHT

(71) Applicant: GIGAPHOTON INC., Oyama-shi, Tochigi (JP)

(72) Inventors: Tsukasa Hori, Hiratsuka (JP); Kouji Kakizaki, Hiratsuka (JP); Tatsuya Yanagida, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 14/201,671

(22) Filed: Mar. 7, 2014

(65) Prior Publication Data

US 2014/0183379 A1    Jul. 3, 2014

Related U.S. Application Data

(63) Continuation of application No. 13/492,067, filed on Jun. 8, 2012, which is a continuation-in-part of application No. PCT/JP2011/052767, filed on Feb. 9, 2011.

(30) Foreign Application Priority Data

| Feb. 19, 2010 | (JP) | 2010-034889 |
| Nov. 29, 2010 | (JP) | 2010-265789 |
| Jan. 27, 2011 | (JP) | 2011-015691 |
| Jun. 15, 2011 | (JP) | 2011-133111 |

(51) Int. Cl.
*H01S 3/131* (2006.01)
*H05G 2/00* (2006.01)
(Continued)

(52) U.S. Cl.
CPC ............... *H05G 2/008* (2013.01); *H05G 2/003* (2013.01); *H05G 2/005* (2013.01); *H01S 3/10061* (2013.01); *H01S 3/131* (2013.01); *H01S 3/2316* (2013.01); *H01S 3/2383* (2013.01)

(58) Field of Classification Search
USPC .................. 250/504 R, 492.1, 492.2, 364
See application file for complete search history.

(56) References Cited

U.S. PATENT DOCUMENTS

| 4,042,848 A | 8/1977 | Lee |
| 6,404,542 B1 | 6/2002 | Ziari et al. |

(Continued)

FOREIGN PATENT DOCUMENTS

| EP | 2538759 A1 | 12/2012 |
| JP | 2000-091095 A | 3/2000 |

(Continued)

OTHER PUBLICATIONS

A.V. Nesterov et al., Laser Beams with Axially Symmetric Polarization, Jornal of Physics D Applied Physics V.33, (2000), p. 1817-1822.

(Continued)

*Primary Examiner* — Phillip A Johnston
*Assistant Examiner* — Hsien Tsai
(74) *Attorney, Agent, or Firm* — Studebaker & Brackett PC

(57) ABSTRACT

A system includes a chamber, a laser beam apparatus configured to generate a laser beam to be introduced into the chamber, a laser controller for the laser beam apparatus to control at least a beam intensity and an output timing of the laser beam, and a target supply unit configured to supply a target material into the chamber, the target material being irradiated with the laser beam for generating extreme ultraviolet light.

16 Claims, 34 Drawing Sheets

(51) Int. Cl.
*H01S 3/10* (2006.01)
*H01S 3/23* (2006.01)

(56) References Cited

U.S. PATENT DOCUMENTS

| | | |
|---|---|---|
| 7,576,343 B2 | 8/2009 | Tomie |
| 8,395,133 B2 | 3/2013 | Moriya et al. |
| 2003/0006383 A1 | 1/2003 | Melnychuk et al. |
| 2004/0159802 A1 | 8/2004 | Ziener et al. |
| 2005/0167618 A1 | 8/2005 | Hoshino et al. |
| 2005/0205811 A1 | 9/2005 | Partlo et al. |
| 2005/0279934 A1 | 12/2005 | Stewart et al. |
| 2006/0215712 A1 | 9/2006 | Ziener et al. |
| 2006/0249698 A1 | 11/2006 | Endo et al. |
| 2007/0007469 A1 | 1/2007 | Murakami et al. |
| 2007/0064747 A1 | 3/2007 | Feve et al. |
| 2007/0114470 A1 | 5/2007 | Bowering |
| 2008/0087847 A1 | 4/2008 | Bykanov et al. |
| 2008/0149862 A1* | 6/2008 | Hansson et al. .......... 250/504 R |
| 2008/0180029 A1 | 7/2008 | Hergenhan et al. |
| 2009/0250637 A1 | 10/2009 | Akins et al. |
| 2009/0250641 A1 | 10/2009 | Moriya et al. |
| 2009/0261242 A1 | 10/2009 | Ueno et al. |
| 2009/0314967 A1 | 12/2009 | Moriya et al. |
| 2010/0078577 A1 | 4/2010 | Moriya et al. |
| 2013/0148677 A1 | 6/2013 | Moriya et al. |

FOREIGN PATENT DOCUMENTS

| | | |
|---|---|---|
| JP | 2000-299197 A | 10/2000 |
| JP | 2003-270551 A | 9/2003 |
| JP | 2004-247293 A | 9/2004 |
| JP | 2006-013033 A | 1/2006 |
| JP | 2006-303461 A | 11/2006 |
| JP | 2007-33437 A | 2/2007 |
| JP | 2007-033437 A | 2/2007 |
| JP | 2008-071547 A | 3/2008 |
| JP | 2008-226462 A | 9/2008 |
| JP | 2008-277204 A | 11/2008 |
| JP | 2008-293738 A | 12/2008 |
| JP | 2009-105006 A | 5/2009 |
| JP | 2009-260019 A | 11/2009 |
| JP | 2010-003548 A * | 1/2010 |
| JP | 2010-3548 A | 1/2010 |
| JP | 2010-21543 A | 1/2010 |
| JP | 2010003548 A * | 1/2010 |
| JP | 2010-076268 A | 4/2010 |
| JP | 2010-186735 A | 8/2010 |
| JP | 5722061 B2 | 5/2015 |
| WO | 2006/093693 A2 | 9/2006 |
| WO | 2009/123733 A1 | 10/2009 |

OTHER PUBLICATIONS

Y Mairesse et al., Electron wavepacket control with elliptically polarized laser light in high harmonic generation from aligned molecules, New Jounral of Physics 10 (2008) 025015 (13pp).

P.F. Moulton, Spectroscopic and laser characteristics of Ti:Al2O3, vol. 3, No. 1/Jan. 1986/J. Opt Soc. Am B, p. 125-133.

Japanese Office Action issued in Japanese Application No. 2011-015691 dated Jul. 8, 2014, w/English translation.

U.S. Office Action issued in U.S. Appl. No. 13/492,067 dated May 8, 2014.

An Office Action; "Notice of Reasons for Rejection," issued by the Japanese Patent Office on Apr. 7, 2015, which corresponds to Japanese Patent Application No. 2011-133111 and is related to U.S. Appl. No. 14/201,671; with English language translation.

An Office Action; "Notice of Reasons for Rejection," issued by the Japanese Patent Office on Aug. 25, 2015, which corresponds to Japanese Patent Application No. 2014-180843 and is related to U.S. Appl. No. 14/201,671; with English language translation.

* cited by examiner 6.4 × 10⁸ W/cm²
(X1.0)

1.6 × 10⁹ W/cm²
(X2.5)

5.5×10⁹ W/cm²
(X8.6)

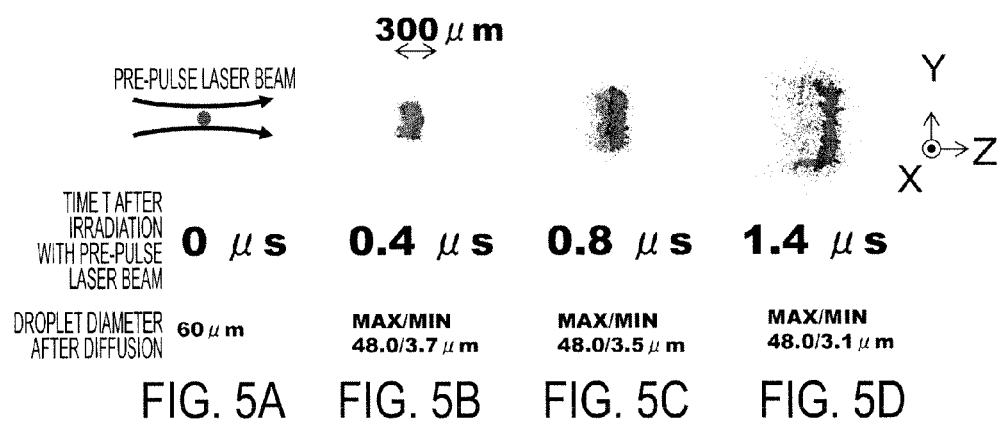
FIG. 5A  FIG. 5B  FIG. 5C  FIG. 5D
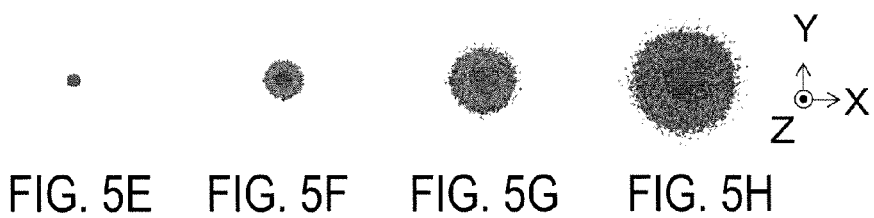
FIG. 5E  FIG. 5F  FIG. 5G  FIG. 5H
◎ IRRADIATION SPOT SIZE OF MAIN PULSE LASER BEAM
200-300 $\mu$m
FIG. 5I

| | FIG. 7A | FIG. 7B | FIG. 7C | FIG. 7D |
|---|---|---|---|---|
| TIME T AFTER IRRADIATION WITH PRE-PULSE LASER BEAM | 0 μs | 0.1 μs | 0.25 μs | 0.5 μs |
| DROPLET DIAMETER AFTER DIFFUSION | 10 μm | MAX/MIN 2.2/0.2 μm | MAX/MIN 1.1/0.2 μm | MAX/MIN 1.1/0.2 μm |
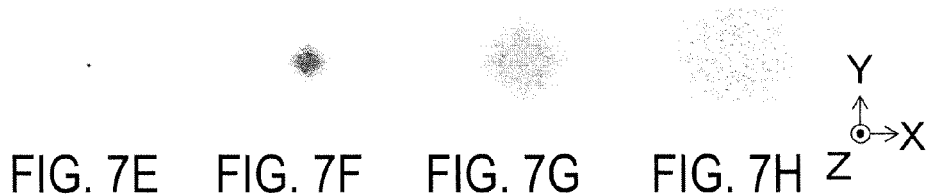
FIG. 7E    FIG. 7F    FIG. 7G    FIG. 7H
◎ IRRADIATION SPOT SIZE OF MAIN PULSE LASER BEAM
200-300 μm
FIG. 7I

IRRADIATION CONDITIONS OF PRE-PULSE LASER BEAM

| | CASE 1 | CASE 2 | CASE 3 | CASE 4 |
|---|---|---|---|---|
| IRRADIATION PULSE ENERGY E (mJ) | 1.9 | 0.17 | 0.15 | 0.1 |
| PULSE DURATION T (ns) | 15 | 15 | 1 | 0.05 |
| IRRADIATION SPOT SIZE Dm (μm) | 100 | 30 | 30 | 30 |
| BEAM INTENSITY W (W/cm$^2$) | $1.61 \times 10^9$ | $1.60 \times 10^9$ | $2.12 \times 10^{10}$ | $2.83 \times 10^{11}$ |

FIG. 17A

IRRADIATION CONDITIONS OF MAIN PULSE LASER BEAM

| | CASE 1 | CASE 2 | CASE 3 | CASE 4 |
|---|---|---|---|---|
| IRRADIATION PULSE ENERGY E (mJ) | 100 | 150 | 200 | 200 |
| PULSE DURATION T (ns) | 20 | 30 | 25 | 50 |
| IRRADIATION SPOT SIZE Dm (μm) | 250 | 250 | 300 | 200 |
| BEAM INTENSITY W (W/cm$^2$) | $1.02 \times 10^{10}$ | $1.02 \times 10^{10}$ | $1.13 \times 10^{10}$ | $1.27 \times 10^{10}$ |

FIG. 17B

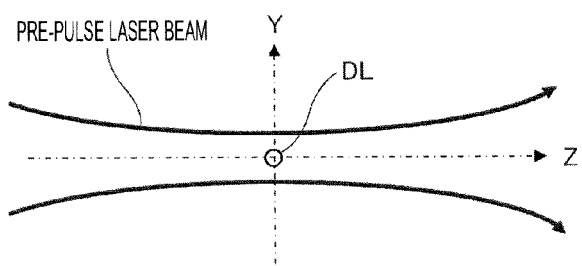
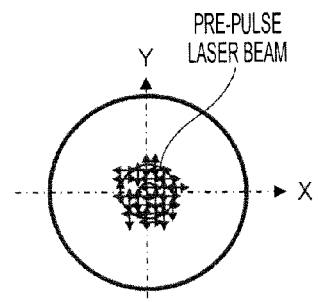
FIG. 23A  FIG. 23B
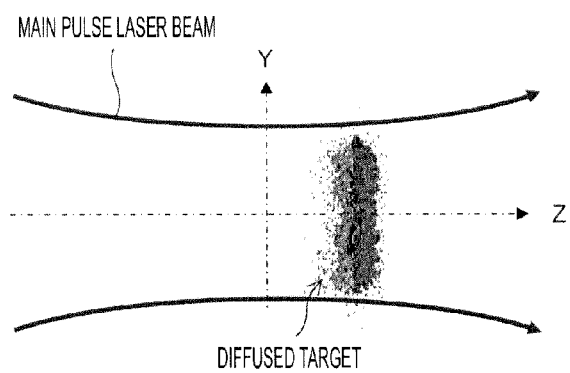
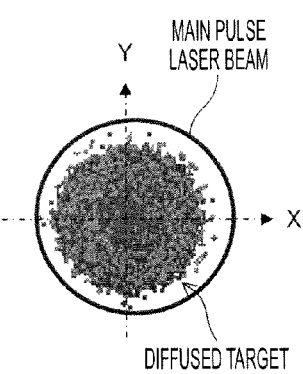
FIG. 23C  FIG. 23D
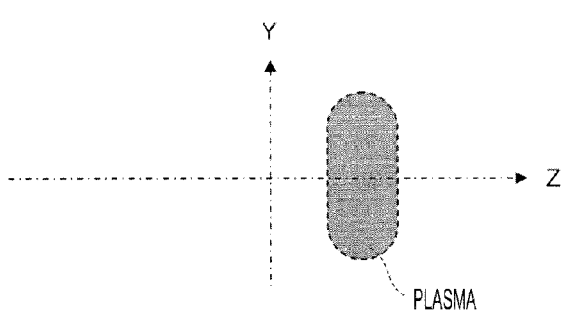
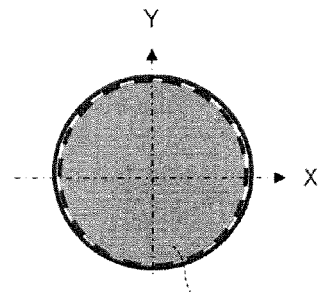
FIG. 23E  FIG. 23F

SYSTEM AND METHOD FOR GENERATING EXTREME ULTRAVIOLET LIGHT

CROSS-REFERENCE TO RELATED APPLICATIONS

The present application is a continuation of U.S. application Ser. No. 13/492,067, filed on Jun. 8, 2012, which is a continuation-in-part of International Application PCT/JP2011/052767, with an international filing date of Feb. 9, 2011, which claims priority from Japanese Patent Application No. 2010-034889 filed Feb. 19, 2010, Japanese Patent Application No. 2010-265789 filed Nov. 29, 2010, and Japanese Patent Application No. 2011-015691 filed Jan. 27, 2011. The present application further claims priority from Japanese Patent Application No. 2011-133111 filed Jun. 15, 2011, the disclosures of which Applications are incorporated by reference herein.

BACKGROUND

1. Technical Field

This disclosure relates to a system and a method for generating extreme ultraviolet (EUV) light.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed in which a system for generating EUV light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used.

SUMMARY

A system according to one aspect of this disclosure may include a chamber, a laser beam apparatus configured to generate a laser beam to be introduced into the chamber, a laser controller for the laser beam apparatus to control at least a beam intensity and an output timing of the laser beam, and a target supply unit configured to supply a target material into the chamber. The target material may be irradiated with the laser beam for generating extreme ultraviolet light.

A system according to another aspect of this disclosure may include a chamber, a laser beam apparatus configured to output a laser beam into the chamber, a laser controller for the laser beam apparatus to control energy of the laser beam to achieve a predetermined fluence, and a target supply unit configured to supply a target material into the chamber. The target material may be irradiated with the laser beam for generating extreme ultraviolet light.

A method according to yet another aspect of this disclosure for generating extreme ultraviolet light in a system that includes a laser beam apparatus, a laser controller, a chamber, and a target supply unit may include supplying a target material into the chamber in a form of a droplet, irradiating the target material with a pre-pulse laser beam from the laser beam apparatus, and irradiating the target material having been irradiated with the pre-pulse laser beam with a main pulse laser beam from the laser beam apparatus in a range of 0.5 μs to 3 μs after the target material is irradiated with the pre-pulse laser beam.

BRIEF DESCRIPTION OF THE DRAWINGS

FIGS. 5A through 5H show the simulation results of diffusion when a molten tin droplet having a diameter of 60 μm is irradiated with a pre-pulse laser beam.

FIG. 5I shows the spot size of a main pulse laser beam.

FIGS. 7A through 7H show the simulation results of diffusion when a molten tin droplet having a diameter of 10 μm is irradiated with a pre-pulse laser beam.

FIG. 7I shows the spot size of a main pulse laser beam.

FIG. 17A is a table showing irradiation conditions of a pre-pulse laser beam in the EUV light generation system of any one of the embodiments.

FIG. 17B is a table showing irradiation conditions of a main pulse laser beam in the EUV light generation system of any one of the embodiments.

FIGS. 23A through 23F show a droplet being irradiated with an unpolarized pre-pulse laser beam and a diffused target being irradiated with a main pulse laser beam according to the seventh embodiment.

DESCRIPTION OF PREFERRED EMBODIMENTS

Figure 1:
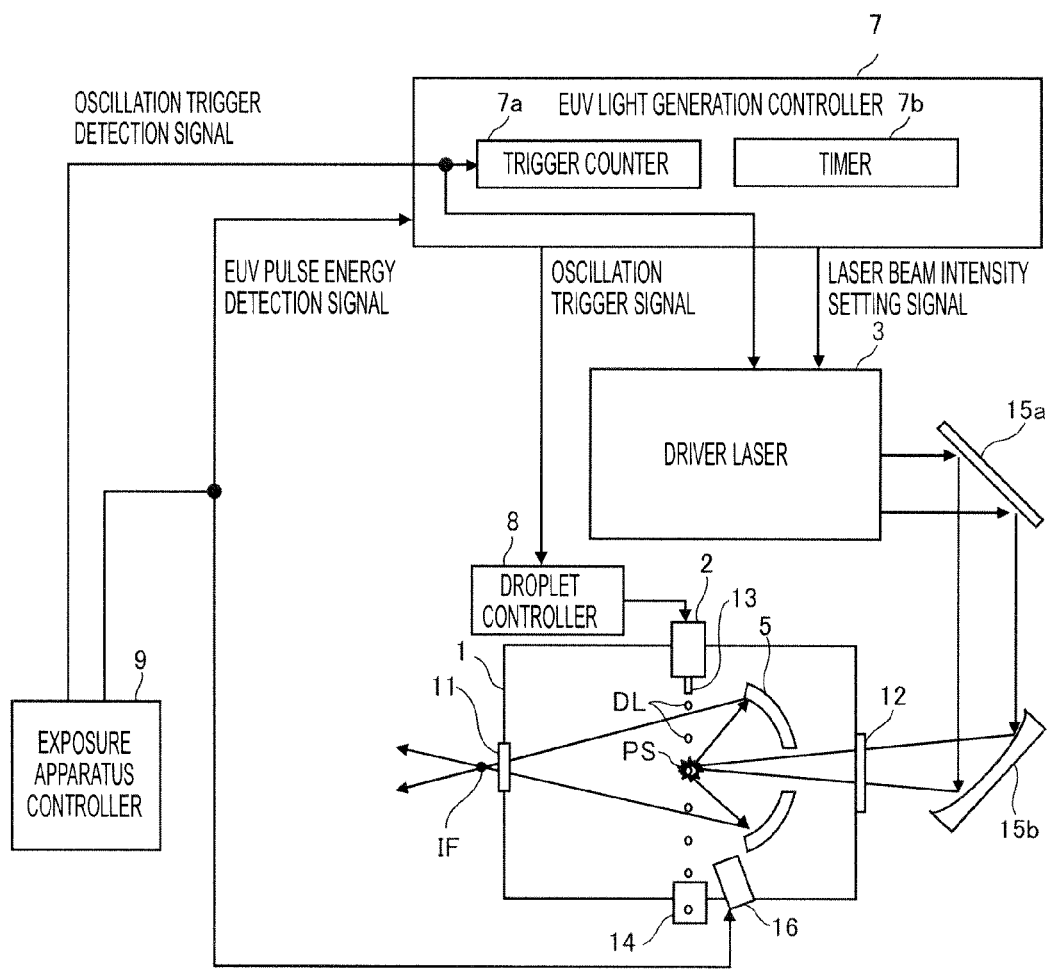
FIG. 1 schematically illustrates an exemplary configuration of an EUV light generation system according to one embodiment of this disclosure.

Hereinafter, selected embodiments of this disclosure will be described in detail with reference to the accompanying drawings. The embodiments to be described below are merely illustrative in nature and do not limit the scope of this disclosure. Further, the configuration(s) and operation(s) described in each embodiment are not all essential in implementing this disclosure. Note that like elements are referenced by like reference numerals and characters, and duplicate descriptions thereof will be omitted herein.

Contents
1. General Configuration
2. Diffusion of Droplet
2.1 Disc-Shaped or Dish-Shaped Diffusion
2.2 Torus-Shaped Diffusion
2.3 Diffusion of Large Droplet
2.4 Diffusion of Small Droplet
3. First Embodiment
4. Second Embodiment
5. Third Embodiment
6. Fourth Embodiment
7. Fifth Embodiment
8. Sixth Embodiment
9. Irradiation Conditions of Laser Beams
10. Seventh Embodiment
10.1 Overview of Polarization Control
10.2 Examples of Polarization Control
10.3 Examples of Polarization Converter
11. Eighth Embodiment
12. Ninth Embodiment
13. Control of Fluence
14. Control of Delay Time 1. General Configuration FIG. 1 schematically illustrates an exemplary configuration of an EUV light generation system according to an embodiment of this disclosure. The EUV light generation system of this embodiment may be of an LPP type. As shown in FIG. 1, the EUV light generation system may include a chamber 1, a target supply unit 2, a driver laser 3, an EUV collector mirror 5, and an EUV light generation controller 7.

The chamber 1 may be a vacuum chamber, and the EUV light is generated inside the chamber 1. The chamber 1 may be provided with an exposure apparatus connection port 11 and a window 12. The EUV light generated inside the chamber 1 may be outputted to an external processing apparatus, such as an exposure apparatus (reduced projection reflective optical system), through the exposure apparatus connection port 11. A laser beam outputted from the driver laser 3 may enter the chamber 1 through the window 12.

The target supply unit 2 may be configured to supply a target material, such as tin (Sn) and lithium (Li), used to generate the EUV light, into the chamber 1 at a timing specified by a droplet controller 8. The target material inside the target supply unit 2 may be outputted through a target nozzle 13 in the form of droplets DL. The droplet DL may, for example, be 10 μm to 100 μm (inclusive) in diameter. Of a plurality of droplets DL supplied into the chamber 1, ones that are not irradiated with a laser beam may be collected into a target collection unit 14.

The driver laser 3 is configured to output a laser beam used to excite the target material. The driver laser 3 may be a master oscillator power amplifier type laser apparatus. The laser beam from the driver laser 3 may be a pulse laser beam with a pulse duration of a few to a few tens of nanoseconds and a repetition rate of 10 kHz to 100 kHz. In this embodiment, the driver laser 3 may be configured to output a pre-pulse laser beam and a main pulse laser beam. As the driver laser 3, a combination of a Yttrium Aluminum Garnet (YAG) laser apparatus for outputting a pre-pulse laser beam and a $CO_2$ laser apparatus for outputting a main pulse laser beam may be used. However, this embodiment is not limited thereto, and any suitable laser apparatus may be used.

Each of the pre-pulse laser beam and the main pulse laser beam from the driver laser 3 may be reflected by a laser beam focusing optical system that includes a high-reflection mirror 15a and an off-axis paraboloidal mirror 15b, and enter the chamber 1 through the window 12. Inside the chamber 1, each of the pre-pulse laser beam and the main pulse laser beam may be focused in a plasma generation region PS.

When the droplet DL is irradiated with the pre-pulse laser beam, the droplet DL may be diffused into fine particles. In this specification, a target material in a state where fine particles of a droplet DL are diffused may be referred to as a diffused target. The diffused target may be irradiated with the main pulse laser beam. Upon being irradiated with the main pulse laser beam, the target material constituting the diffused target may be excited by the energy of the main pulse laser beam. With this, the target material may be turned into plasma, and rays of light at various wavelengths including the EUV light may be emitted from the plasma.

The EUV collector mirror 5 may be configured to selectively reflect light at a predetermined wavelength (e.g., EUV light at a central wavelength of approximately 13.5 nm) among rays of light at various wavelengths emitted from the plasma. The EUV collector mirror 5 may have a spheroidal concave surface on which a multilayer reflective film formed of a molybdenum (Mo) layer and a silicon (Si) layer laminated alternately is formed. The EUV collector mirror 5 may be positioned such that a first focus of the spheroidal surface lies in the plasma generation region PS and a second focus thereof lies in an intermediate focus region IF. With this, the EUV light reflected by the EUV collector mirror 5 may be focused at the second focus, and outputted to an external exposure apparatus.

The EUV light generation controller 7 may be configured to output an oscillation trigger signal and a laser beam intensity setting signal to the driver laser 3. With this, the EUV light generation controller 7 may control the beam intensity and the generation timing of the pre-pulse laser beam such that a droplet supplied into the chamber 1 is transformed into a desired diffused target. Further, the EUV light generation controller 7 may control the beam intensity and the generation timing of the main pulse laser beam such that plasma in a desired condition may be generated from the diffused target upon being irradiated with the main pulse laser beam.

The oscillation trigger signal may be outputted based on an oscillation trigger detection signal from an exposure apparatus controller 9, and the generation timing of the laser beams by the driver laser 3 may be controlled accordingly. The laser beam intensity setting signal may be outputted based on the oscillation trigger detection signal from the exposure apparatus controller 9 and an EUV pulse energy detection signal from either an EUV light detector 16 or the exposure apparatus controller 9. The laser beam intensity setting signal may be outputted to the driver laser 3 in order to control the beam intensity of the laser beams. The EUV light generation controller 7 may include a trigger counter 7a and a timer 7b, and may count the number of oscillation trigger detection signals per unit time. The laser beam intensity setting signal may be outputted based on the EUV pulse energy detection signal and the number of counted oscillation trigger detection signals.

2. Diffusion of Droplet

Figure 2:
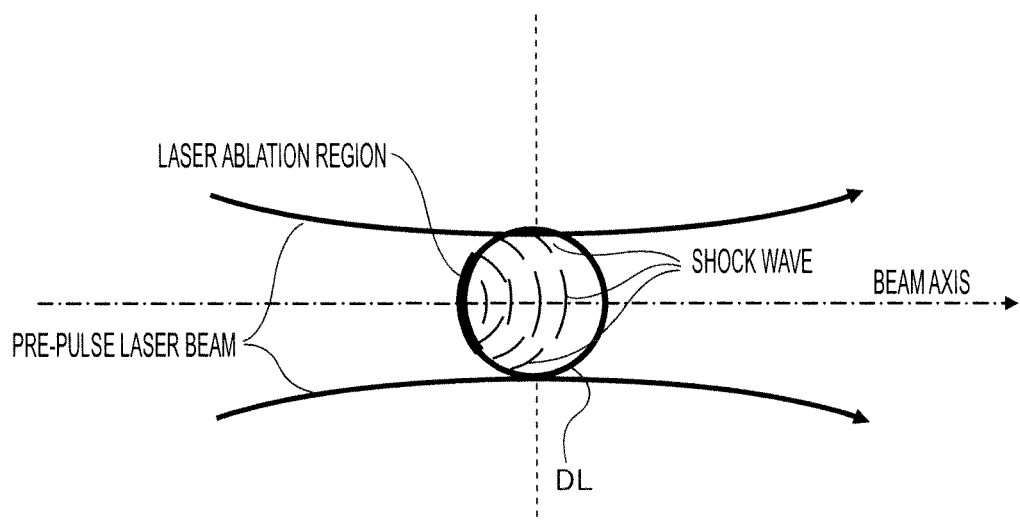
FIG. 2 is a conceptual diagram showing a droplet being irradiated with a pre-pulse laser beam.

Diffusion of a droplet upon being irradiated with a pre-pulse laser beam will now be discussed. FIG. 2 is a conceptual diagram showing a droplet being irradiated with a pre-pulse laser beam. In FIG. 2, the droplet is viewed in a direction perpendicular to the beam axis (Z-direction) of the pre-pulse laser beam.

As shown in FIG. 2, when the pre-pulse laser beam is focused on the droplet DL, laser ablation may occur at a surface of the droplet DL that has been irradiated with the pre-pulse laser beam. As a result, a shock wave may occur from the surface of the droplet DL irradiated with the pre-pulse laser beam toward the interior of the droplet DL due to the energy by the laser ablation. This shock wave may propagate throughout the droplet DL. The droplet DL may not be broken up when the beam intensity of the pre-pulse laser beam is weak. However, when the beam intensity of the pre-pulse laser beam is equal to or greater than a first predetermined value (e.g., $1 \times 10^9$ W/cm$^2$), the droplet DL may be broken up by this shock wave.

2.1 Disc-Shaped or Dish-Shaped Diffusion

Figure 3A:
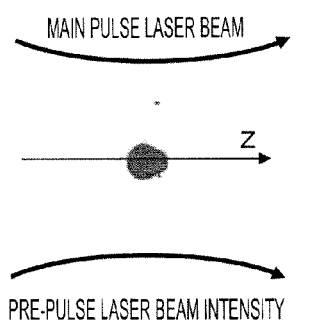
FIGS. 3A through 3C show simulation results of diffusion when a molten tin droplet is irradiated with a pre-pulse laser beam.
Figure 3B:
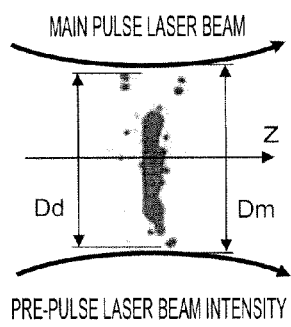
Figure 3C:
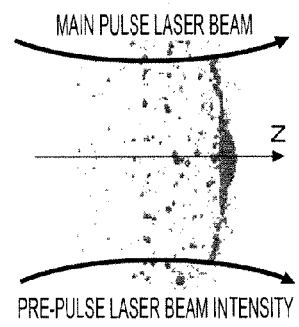
Figure 3D:
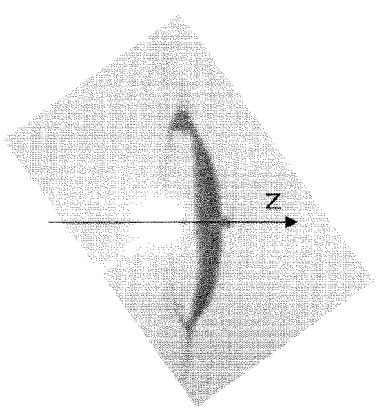
FIG. 3D is a photograph capturing a molten tin droplet being irradiated with a pre-pulse laser beam.

FIGS. 3A through 3C show the simulation results of diffusion of a molten tin droplet being irradiated with a pre-pulse laser beam. FIG. 3D is a photograph capturing a molten tin droplet being irradiated with a pre-pulse laser beam under the condition that is identical to that in the simulation shown in FIG. 3C. In each of FIGS. 3A through 3D, the droplet is viewed in a direction perpendicular to the beam axis of the pre-pulse laser beam (Z-direction). Further, in FIGS. 3A through 3C, the spot size of the main pulse laser beam and the beam intensity of the pre-pulse laser beam striking the droplet DL are indicated. In FIG. 3B, a diffusion diameter Dd of the diffused target and an irradiation spot size Dm of the main pulse laser beam are indicated.

As shown in FIG. 3A, when the beam intensity of the pre-pulse laser beam is $6.4 \times 10^8$ W/cm$^2$, the droplet is hardly diffused. On the other hand, as shown in FIG. 3B, when the beam intensity of the pre-pulse laser beam is $1.6 \times 10^9$ W/cm$^2$ (2.5 times greater than the beam intensity in the simulation shown in FIG. 3A), the droplet is broken up. The broken-up droplet is turned into numerous minute particles and forms a diffused target. These minute particles may be diffused in a disc-shape as viewed in the Z-direction. Further, as shown in FIG. 3C, when the beam intensity of the pre-pulse laser beam is $5.5 \times 10^9$ W/cm$^2$ (8.6 times greater than the beam intensity in the simulation shown in FIG. 3A), the droplet is broken up, and the minute particles of the broken-up droplet may be diffused in a dish-shape. As can been seen from the comparison between FIG. 3C and FIG. 3D, the state of the actual diffusion of the minute particles were similar to the simulation result.

In the case shown in FIG. 3A, it is speculated that even when the droplet is irradiated with the main pulse laser beam, a large portion of the energy of the main pulse laser beam is not absorbed by the droplet, whereby a high CE may not be obtained. That is, with respect to the size of the target material after being irradiated with the pre-pulse laser beam, the irradiation spot size of the main pulse laser beam is too large. Accordingly, a large portion of the main pulse laser beam may not strike the droplet and may not be used to generate plasma. On the other hand, in the cases shown in FIGS. 3B and 3C, the droplet is diffused in the irradiation spot of the main pulse laser beam, whereby a large portion of the main pulse laser beam may be used to generate plasma. Further, a diffused target may have a greater total surface area than a single droplet. As shown below, when a single droplet is broken into $n^3$ smaller pieces, the radius of a smaller piece may become $(1/n)$ of the radius of the original droplet. Here, the total surface area of the smaller pieces may be n times greater than the surface area of the original droplet.

When the radius of an undiffused droplet is r, a volume $V_1$ of the undiffused droplet may be expressed in Expression (1) below.

$$V_1 = 4\pi r^3/3 \quad (1)$$

A total volume $V_2$ of $n^3$ smaller pieces each having a radius $(r/n)$ may be expressed in Expression (2) below.

$$V_2 = n^3 \times 4\pi (r/n)^3/3 \quad (2)$$

The total volume $V_2$ of $n^3$ smaller pieces each having the radius $(r/n)$ may be equal to the volume $V_1$ of the undiffused droplet having the radius r $(V_2 = V_1)$.

A surface area $S_1$ of the undiffused droplet having the radius r may be expressed in Expression (3) below.

$$S_1 = 4\pi r^2 \quad (3)$$

A total surface area $S_2$ of $n^3$ smaller pieces each having the radius $(r/n)$ may be expressed in Expression (4) below.

$$S_2 = n^3 \times 4\pi (r/n)^2 = n \times 4\pi r^2 \quad (4)$$

Accordingly, the total surface area $S_2$ of $n^3$ smaller pieces each having the radius $(r/n)$ is n times greater than the surface area $S_1$ of the undiffused droplet having the radius r.

In this way, in the cases shown in FIGS. 3B and 3C, the droplet may be diffused, and the total surface area may be increased. As a result, the energy of the main pulse laser beam may be absorbed efficiently by the diffused small particles. With this, a larger portion of the diffused small particles may be turned into plasma, and EUV light with higher energy may be obtained. Accordingly, a high CE may be obtained.

In either of the cases shown in FIGS. 3B and 3C, the diffused target has such a shape that the length in the direction of the beam axis of the pre-pulse laser beam is shorter than the length in the direction perpendicular to the beam axis of the pre-pulse laser beam. The diffused target having such a shape may be irradiated with the main pulse laser beam traveling substantially along the same path as the pre-pulse laser beam. Since the diffused target may be irradiated with the main pulse laser beam more uniformly, the main pulse laser beam may be absorbed efficiently by the target material.

The diffusion diameter Dd of the diffused target may be equal to or smaller than the irradiation spot size Dm of the main pulse laser beam. Because of this size, the entire diffused target may be irradiated with the main pulse laser beam, and thus a larger portion of the diffused target may be turned into plasma. As a result, generation of debris of the target material may be suppressed.

Further, the diffusion diameter Dd of the diffused target may be equal to or closer to the irradiation spot size Dm of the main pulse laser beam. With this, a larger portion of the energy of the main pulse laser beam may be absorbed by the diffused target, whereby a higher CE may be obtained.

Although FIG. 3B shows that the position of the beam waist of the main pulse laser beam substantially coincides with the position of the diffused target, this disclosure is not limited thereto. That is, the position of the beam waist of the main pulse laser beam and the position of the diffused target do not necessarily have to coincide with each other. In this disclosure, the irradiation spot size Dm may be interpreted as a diameter of a cross-section of the main pulse laser beam at or around the position at which the diffused target is irradiated with the main pulse laser beam.

Although a case where the main pulse laser beam has a circular cross-section and the cross-section of the diffused target is circular has been described, this disclosure is not limited thereto. For example, a cross-section area of the main pulse laser beam may be larger than a maximum cross-section area of the diffused target.

2.2 Torus-Shaped Diffusion

Figure 4A:
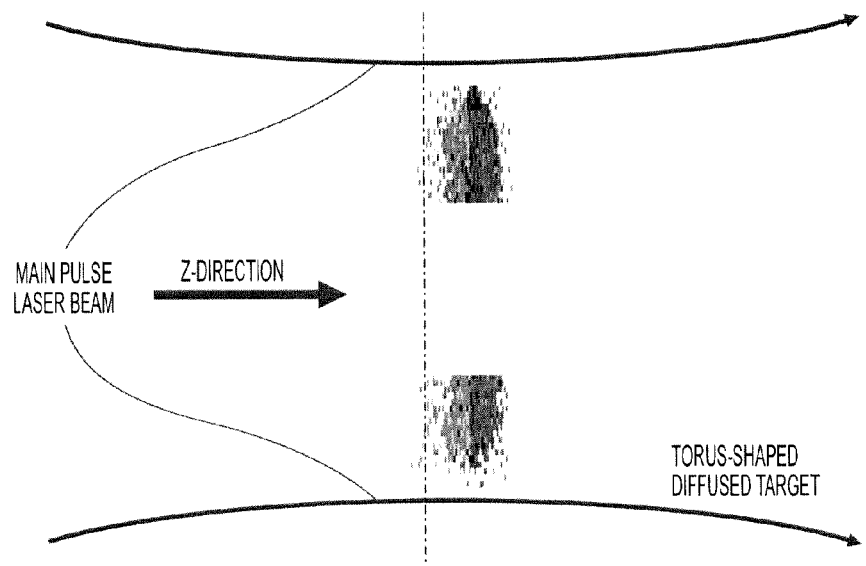
FIG. 4A schematically shows a molten tin droplet being irradiated with a pre-pulse laser beam, as viewed in the direction perpendicular to the beam axis.
Figure 4B:
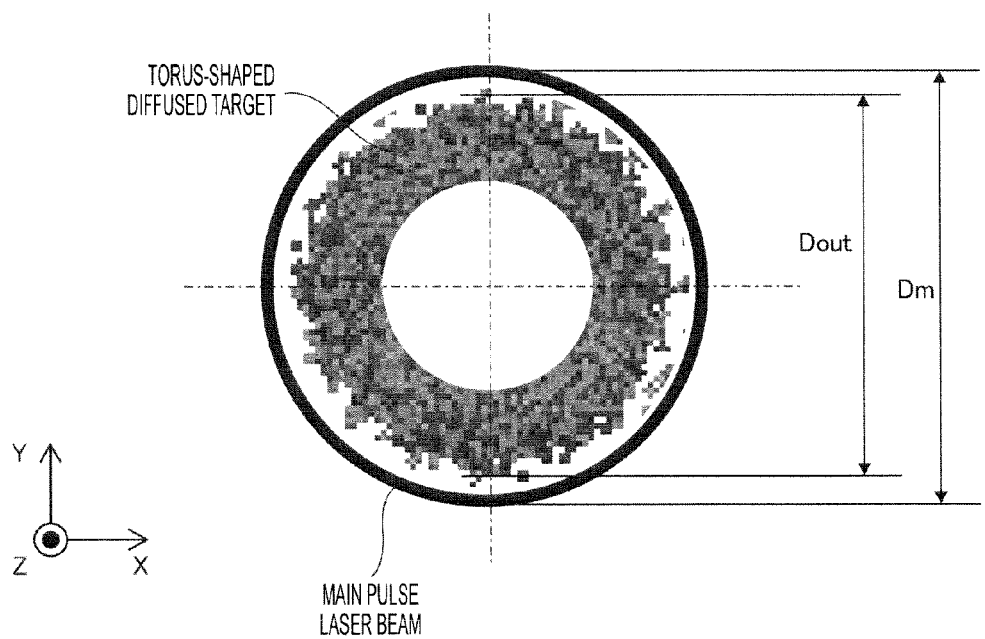
FIG. 4B schematically shows a molten tin droplet being irradiated with a pre-pulse laser beam, as viewed in the direction of the beam axis.

FIGS. 4A and 4B schematically show a molten tin droplet having been irradiated with the pre-pulse laser beam. In FIG. 4A, the diffused target is viewed in a direction perpendicular to the beam axes of the pre-pulse laser beam and the main pulse laser beam (Z-direction). In FIG. 4B, the diffused target is viewed in a direction of the beam axes of the pre-pulse laser beam and the main pulse laser beam. In FIG. 4B, an outer diameter Dout of a torus-shaped diffused target and the irradiation spot size Dm of the main pulse laser beam are indicated.

As described with reference to FIG. 2, when the pre-pulse laser beam is focused on the droplet DL, laser ablation may occur at the surface of the droplet DL. Here, when the beam intensity of the pre-pulse laser beam is equal to or greater than a second predetermined value (e.g., $6.4 \times 10^9$ W/cm$^2$), the droplet DL may be broken up, and a torus-shaped diffused target as shown in FIGS. 4A and 4B may be formed. The torus-shaped diffused target may be diffused symmetrically about the beam axis of the pre-pulse laser beam and into a torus-shape.

For example, for generating a torus-shaped diffused target, the beam intensity of the pre-pulse laser beam may be in the range of $6.4 \times 10^9$ W/cm$^2$ to $3.2 \times 10^{10}$ W/cm$^2$ (inclusive), and the diameter of the droplet may be in the range of 12 μm and 40 μm (inclusive).

Irradiation of the torus-shaped diffused target with the main pulse laser beam will now be described. A torus-shaped diffused target may be formed in 0.5 μs to 2.0 μs after a droplet is irradiated with a pre-pulse laser beam. Accordingly, the diffused target may preferably be irradiated with the main pulse laser beam in the above time span after the droplet is irradiated with the pre-pulse laser beam.

Further, as shown in FIGS. 4A and 4B, the torus-shaped diffused target has such a shape that the length in the direction of the beam axis of the pre-pulse laser beam is shorter than the length in the direction perpendicular to the beam axis of the pre-pulse laser beam. The diffused target having such a shape may be irradiated with the main pulse laser beam traveling substantially along the same path as the pre-pulse laser beam. With this, the diffused target may be irradiated with the main pulse laser beam more efficiently, and thus the main pulse laser beam may be absorbed efficiently by the target material. Accordingly, the CE in the LPP type EUV light generation system may be improved. The CE of approximately 3% was obtained through an experiment under the above conditions.

For example, it is speculated that when a torus-shaped diffused target is irradiated with a main pulse laser beam of a Gaussian beam intensity distribution, plasma is emitted cylindrically from the torus-shaped diffused target. Then, the plasma diffused toward the inner portion of the cylinder may be trapped therein. Accordingly, high-temperature, high-density plasma may be generated, and the CE may be improved. Here, "torus-shape" means an annular shape, but the diffused target does not necessarily have to be perfectly annular in shape, and may be substantially annular in shape.

Further, the irradiation spot size Dm of the main pulse laser beam may preferably be in the following relationship with the outer diameter Dout of the torus-shaped diffused target.

$$Dm \geq Dout$$

With this relationship, the entire torus-shaped diffused target may be irradiated with the main pulse laser beam, and a larger portion of the diffused target may be turned into plasma. As a result, generation of debris of the target material may be reduced.

2.3 Diffusion of Large Droplet

FIGS. 5A through 5H show the simulation result of diffusion when a molten tin droplet having a diameter of 60 μm is irradiated with a pre-pulse laser beam. In each of FIGS. 5A through 5D, the droplet or the diffused target is viewed in a direction (X-direction) perpendicular to the beam axis of the pre-pulse laser beam (Z-direction). FIGS. 5A through 5D respectively show the states of the target material at timings where a time T is 0 μs, 0.4 μs, 0.8 μs, and 1.4 μs after the droplet DL is irradiated with the pre-pulse laser beam. In each of FIGS. 5E through 5H, the droplet or the diffused target is viewed in the direction (Z-direction) of the beam axis of the pre-pulse laser beam. FIGS. 5E through 5H respectively show the states of the target material at timings where a time T is 0 μs, 0.4 μs, 0.8 μs, and 1.4 μs after the droplet DL is irradiated with the pre-pulse laser beam. FIG. 5I shows the irradiation spot size of the main pulse laser beam at a position where the diffused target is irradiated with the main pulse laser beam. Here, the beam intensity of the pre-pulse laser beam is 1.5× $10^9$ W/cm$^2$.

With reference to the simulation results shown in FIGS. 5A through 5H along with the irradiation spot size of the main pulse laser beam shown in FIG. 5I, the following can be found. A large portion of the diffused target may be irradiated with the main pulse laser beam in approximately 0.4 μs after a droplet is irradiated with the pre-pulse laser beam. Accordingly, generation of debris may be reduced if the diffused target is irradiated with the main pulse laser beam at the above timing.

A droplet having a diameter of 60 μm may be broken into small particles and diffused upon being irradiated with a pre-pulse laser beam. In each of FIGS. 5A through 5D, the maximum value and the minimum value of a diameter of a small particle in the diffused target are indicated. With the beam intensity of the pre-pulse laser beam in this simulation, the maximum value of a diameter of a small particle in the diffused target is 48.0 μm. That is, the droplet has not been broken up sufficiently by the pre-pulse laser beam, and a large portion of the diffused target may not be turned into plasma even when the diffused target is irradiated with the main pulse laser beam. This may suggest that a large amount of debris may be generated. The minimum value of a diameter of a small particle in the diffused target is 3.7 μm in 0.4 μs, 3.5 μm in 0.8 μs, and 3.1 μm in 1.4 μs, respectively, after a droplet is irradiated with a pre-pulse laser beam. This suggests that the more the time T elapses after a droplet is irradiated with a pre-pulse laser beam, the smaller the diameter of a small particle becomes, and the number of small particles may increase. This in turn suggests that in the case where a molten tin droplet having a diameter of 60 μm is irradiated with a pre-pulse laser beam, if a diffused target is irradiated with a main pulse laser beam within a range where the time T after the droplet is irradiated with the pre-pulse laser beam is between 0.4 μs and 1.4 μs, the CE may be improved further with a longer time T.

Figure 6:
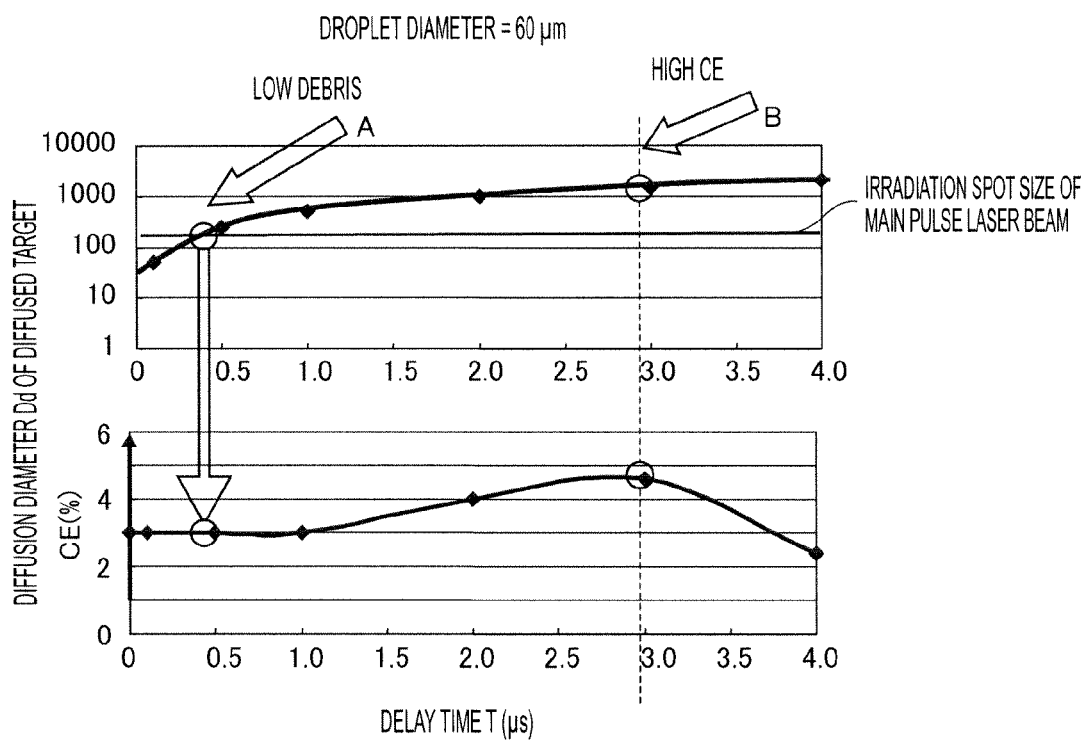
FIG. 6 shows a diffusion diameter of a diffused target generated when a molten tin droplet having a diameter of 60 μm is irradiated with a pre-pulse laser beam and a conversion efficiency (CE) corresponding to a timing at which the diffused target is irradiated with a main pulse laser beam.

FIG. 6 shows a change over time in the diffusion diameter Dd of the diffused target when a molten tin droplet having a diameter of 60 μm is irradiated with the pre-pulse laser beam and a conversion efficiency when the diffused target is irradiated with a main pulse laser beam at a given point in time. As shown in FIGS. 5F and 6, the diffusion diameter Dd of the diffused target may substantially coincide with the irradiation spot size of the main pulse laser beam in approximately 0.4 μs after the droplet is irradiated with the pre-pulse laser beam. Accordingly, generation of debris may be reduced if the diffused target is irradiated with the main pulse laser beam in 0.4 μs after the droplet is irradiated with the pre-pulse laser beam (see a white arrow A in FIG. 6). On the other hand, with reference to FIG. 6, a high CE may be obtained if the diffused target is irradiated with the main pulse laser beam in approximately 3 μs after the droplet is irradiated with the pre-pulse laser beam (see a white arrow B in FIG. 6). This simulation results suggest that a preferable delay time for the main pulse laser beam from the irradiation with the pre-pulse laser beam to reduce generation of debris may differ from a preferable delay time to obtain a high CE. That is, when a molten tin droplet having a diameter of 60 μm is irradiated sequentially with a pre-pulse laser beam and then a main pulse laser beam, it may be difficult to reduce debris and obtain a high CE at the same time.

2.4 Diffusion of Small Droplet

FIGS. 7A through 7H show the simulation results of diffusion when a molten tin droplet having a diameter of 10 μm is irradiated with the pre-pulse laser beam. In each of FIGS. 7A through 7D, the droplet or the diffused target is viewed in a direction (X-direction) perpendicular to the beam axis of the pre-pulse laser beam (Z-direction). FIGS. 7A through 7D respectively show the states of the target material at timings where a time T is 0 μs, 0.1 μs, 0.25 μs, and 0.5 μs after the droplet is irradiated with the pre-pulse laser beam. In each of FIGS. 7E through 7H, the droplet or the diffused target is viewed in the direction of the beam axis of the pre-pulse laser beam (Z-direction). FIGS. 7E through 7H respectively show the states of the target material at timings where a time T is 0 μs, 0.1 μs, 0.25 μs, and 0.5 μs after the droplet is irradiated with the pre-pulse laser beam. FIG. 7I shows the irradiation spot size of the main pulse laser beam at a position where the diffused target is irradiated with the main pulse laser beam. Here, the beam intensity of the pre-pulse laser beam is 1.5× $10^9$ W/cm$^2$.

With reference to the simulation results shown in FIGS. 7A through 7H along with the irradiation spot size of the main pulse laser beam shown in FIG. 7I, it can be said that a large portion of the diffused target may be irradiated with the main pulse laser beam in 0.1 μs after the droplet is irradiated with the pre-pulse laser beam. Accordingly, generation of debris may be reduced if the diffused target is irradiated with the main pulse laser beam at the above timing.

As shown in FIGS. 7A through 7D, the maximum value of a diameter of a small particle in a diffused target is 2.2 μm in 0.1 μs, 1.1 μm in 0.25 μs, and 1.1 μs in 0.5 μs after the droplet is irradiated with the pre-pulse laser beam. This suggests that the maximum value of a diameter of a small particle in a diffused target becomes constant in 0.25 μs after the droplet is irradiated with the pre-pulse laser beam. The minimum value of a diameter of a small particle in the diffused target is 0.2 μm in 0.1 μs, 0.2 μm in 0.25 μs, and 0.2 μm in 0.5 μs after the droplet is irradiated with the pre-pulse laser beam. This suggests that a small particle in a diffused target is sufficiently small in 0.1 μs after the droplet is irradiated with the pre-pulse laser beam. This in turn suggests that a higher CE may be obtained if the diffused target is irradiated with the main pulse laser beam in 0.1 μs after the droplet is irradiated with the pre-pulse laser beam.

Figure 8:
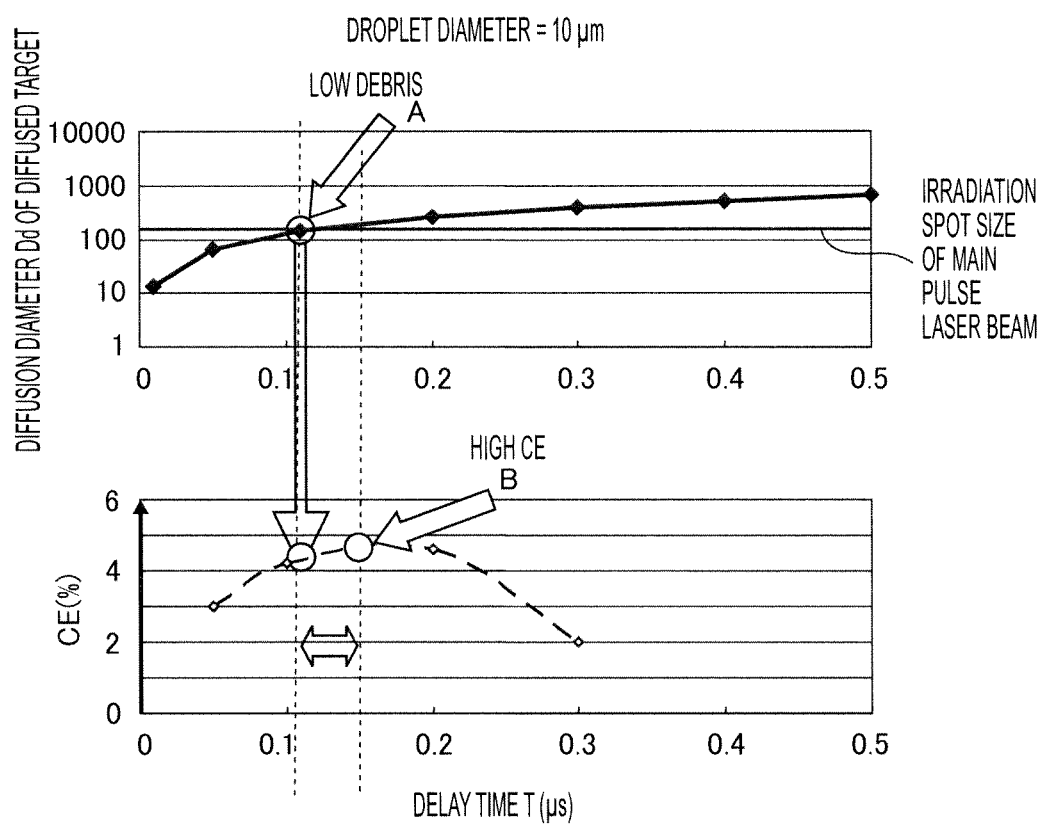
FIG. 8 shows a diffusion diameter of a diffused target generated when a molten tin droplet having a diameter of 10 μm is irradiated with a pre-pulse laser beam and a conversion efficiency (CE) corresponding to a timing at which the diffused target is irradiated with a main pulse laser beam.

FIG. 8 shows a change over time in the diffusion diameter Dd of the diffused target when a molten tin droplet having a diameter of 10 μm is irradiated with the pre-pulse laser beam and a conversion efficiency when the diffused target is irradiated with the main pulse laser beam at a given point in time.

As shown in FIGS. 7F and 8, the diffusion diameter Dd of the diffused target may substantially coincide with the irradiation spot size of the main pulse laser beam in 0.1 μs after the droplet is irradiated with the pre-pulse laser beam. Accordingly, generation of debris may be reduced if the diffused target is irradiated with the main pulse laser beam in 0.1 μs after the droplet is irradiated with the pre-pulse laser beam (see a white arrow A in FIG. 8). On the other hand, with reference to FIG. 8, a high CE may be obtained if the diffused target is irradiated with the main pulse laser beam in approximately 0.15 μs after the droplet is irradiated with the pre-pulse laser beam (see a white arrow B in FIG. 8). The simulation results suggest that a gap between a preferable delay time for the main pulse laser beam to reduce debris and a preferable delay time for the main pulse laser beam to obtain a high CE is relatively small. That is, when a molten tin droplet having a diameter of 10 μm is irradiated sequentially with the pre-pulse laser beam and then the main pulse laser beam, it may be possible to reduce debris and obtain a high CE at the same time. A molten tin droplet having a diameter of 10 μm may be referred to as a mass-limited target since it is a target with a minimum mass required for generating desired EUV light.

3. First Embodiment

Figure 9:
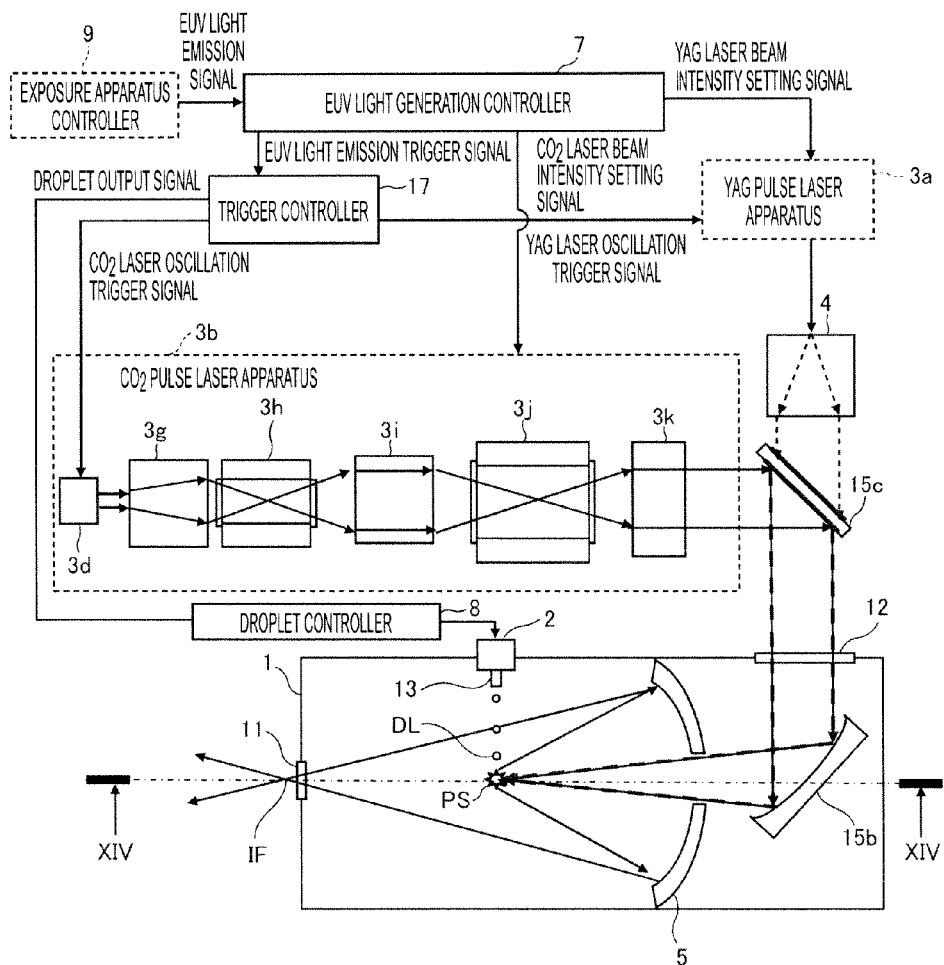
FIG. 9 schematically illustrates an exemplary configuration of an EUV light generation system according to a first embodiment.

FIG. 9 schematically illustrates an exemplary configuration of an EUV light generation system according to a first embodiment. In the EUV light generation system according to the first embodiment, a beam path of a pre-pulse laser beam from a YAG pulse laser apparatus 3a and a beam path of a main pulse laser beam from a $CO_2$ pulse laser apparatus 3b may be made to substantially coincide with each other by a beam combiner 15c. That is, in the first embodiment, the pre-pulse laser beam and the main pulse laser beam are guided into the chamber 1 along substantially the same path.

First, an EUV light emission signal may be inputted to the EUV light generation controller 7 from the exposure apparatus controller 9. The EUV light generation controller 7 may be configured to output a YAG laser beam intensity setting signal to the YAG pulse laser apparatus 3a. Further, the EUV light generation controller 7 may be configured to output a $CO_2$ laser beam intensity setting signal to the $CO_2$ pulse laser apparatus 3b.

In addition, the EUV light generation controller 7 may be configured to output an EUV light emission trigger signal to a trigger controller 17. The trigger controller 17 may be configured to output a droplet output signal to a droplet controller 8. The droplet controller 8 may input the droplet output signal to the target supply unit 2, and upon receiving the droplet output signal, the target supply unit 2 may output a droplet DL through the target nozzle 13. The trigger controller 17 may be configured to output a YAG laser oscillation trigger signal to the YAG pulse laser apparatus 3a. The YAG laser oscillation trigger signal may be outputted such that the droplet DL is irradiated with the pre-pulse laser beam at a timing at which the droplet DL reaches the plasma generation region PS. Further, the trigger controller 17 may be configured to output a $CO_2$ laser oscillation trigger signal to a master oscillator 3d in the $CO_2$ pulse laser apparatus 3b. The $CO_2$ laser oscillation trigger signal may be outputted such that the diffused target is irradiated with the main pulse laser beam after a delay time T from the timing at which the droplet DL is irradiated with the pre-pulse laser beam. Here, the delay time T is a time required for a desired diffused target to be formed.

The YAG pulse laser apparatus 3a may be configured to output the pre-pulse laser beam at a first wavelength based on the YAG laser beam intensity setting signal from the EUV light generation controller 7 and the YAG laser oscillation trigger signal from the trigger controller 17. The pre-pulse laser beam from the YAG pulse laser apparatus 3a may be expanded in diameter by a beam expander 4 and then be incident on the beam combiner 15c.

The $CO_2$ pulse laser apparatus 3b may include the master oscillator 3d, a preamplifier 3h, a main amplifier and relay optical systems 3g, 3i, and 3k respectively disposed downstream from the master oscillator 3d, the preamplifier 3h, and the main amplifier 3j. The master oscillator 3d may be configured to output a seed beam at a second wavelength based on the $CO_2$ pulse laser oscillation trigger signal. The seed beam from the master oscillator 3d may be amplified to desired beam intensity by the preamplifier 3h and the main amplifier 3j based on the $CO_2$ laser beam intensity setting signal. The amplified laser beam may be outputted from the $CO_2$ pulse laser apparatus 3b as the main pulse laser beam and be incident on the beam combiner 15c.

The beam combiner 15c may be configured to transmit the pre-pulse laser beam at the first wavelength (e.g., 1.06 μm) and reflect the main pulse laser beam at the second wavelength (e.g., 10.6 μm). More specifically, the beam combiner 15c may include a diamond substrate on which a multilayer film having the aforementioned reflection/transmission properties for the pre-pulse laser and the main pulse laser is formed. Accordingly, the beam combiner 15c may serve to make the beam path of the pre-pulse laser beam and the beam path of the main pulse laser beam coincide with each other and supply the pre-pulse laser beam and the main pulse laser beam into the chamber 1 along the same path. Alternatively, a beam combiner configured to reflect the pre-pulse laser beam at the first wavelength and transmit the main pulse laser beam at the second wavelength may be used to make the respective beam paths coincide with each other.

The droplet controller 8, the YAG pulse laser apparatus 3a, and the $CO_2$ pulse laser apparatus 3b may operate in synchronization with one another based on the various signals from the trigger controller 17. With this, the YAG pulse laser apparatus 3a may output the pre-pulse laser beam in synchronization with the timing at which the droplet supplied into the chamber 1 from the target supply unit 2 reaches a predetermined region. Then, the $CO_2$ pulse laser apparatus 3b may output the main pulse laser beam in synchronization with the timing at which a desired diffused target is formed after the droplet is irradiated with the pre-pulse laser beam.

According to the first embodiment, the pre-pulse laser beam and the main pulse laser beam may be guided to the plasma generation region PS in substantially the same direction (substantially the same path). Thus, a through-hole formed in the EUV collector mirror 5 may be made small and need not be formed in plurality.

Further, the wavelength (e.g., 1.06 μm) of the pre-pulse laser beam from the YAG pulse laser apparatus 3a is equal to or shorter than one-tenth of the wavelength (e.g., 10.6 μm) of the main pulse laser beam from the $CO_2$ pulse laser apparatus 3b. When the wavelength of the pre-pulse laser beam is sufficiently shorter than the wavelength of the main pulse laser beam, the following advantages may be speculated.

(1) The absorptivity of the pre-pulse laser beam by the target material, such as tin, may be higher than that of the main pulse laser beam.

(2) The irradiation spot size of the pre-pulse laser beam focused on the droplet may be reduced.

As a result, a small droplet DL may be irradiated efficiently with the pre-pulse laser beam having small pulse energy and be diffused.

4. Second Embodiment

Figure 10:
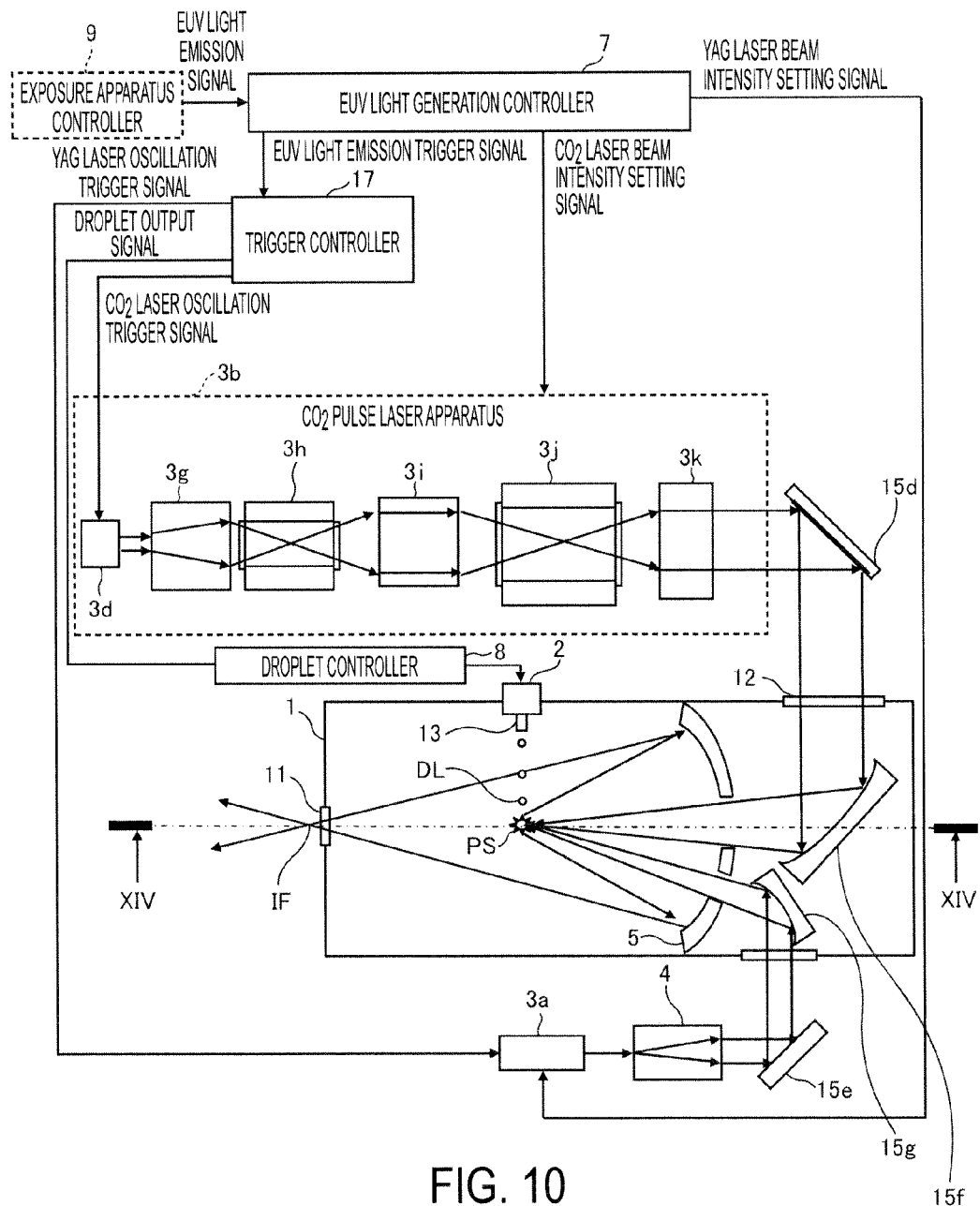
FIG. 10 schematically illustrates an exemplary configuration of an EUV light generation system according to a second embodiment.

FIG. 10 schematically illustrates an exemplary configuration of an EUV light generation system according to a second embodiment. In the EUV light generation system according to the second embodiment, the pre-pulse laser beam from the YAG pulse laser apparatus 3a and the main pulse laser beam from the $CO_2$ pulse laser apparatus 3b are guided into the chamber 1 along separate beam paths.

The pre-pulse laser beam outputted from the YAG pulse laser apparatus 3a may be reflected by a high-reflection mirror 15e and an off-axis paraboloidal mirror 15g. Then, the pre-pulse laser beam may pass through a through-hole formed in the EUV collector mirror 5, and be focused on a droplet inside the chamber 1 to form a diffused target.

The main pulse laser beam outputted from the $CO_2$ pulse laser apparatus 3b may be reflected by a high-reflection mirror 15d and an off-axis paraboloidal mirror 15f. Then, the main pulse laser beam may pass through another through-hole formed in the EUV collector mirror 5, and be focused on the diffused target inside the chamber 1.

According to the second embodiment, the pre-pulse laser beam and the main pulse laser beam may be guided through separate optical systems to the plasma generation region PS. Accordingly, each of the pre-pulse laser beam and the main pulse laser beam may be focused to have a desired beam spot with ease. Further, an optical element, such as a beam combiner, for making the beam paths of the pre-pulse laser beam and the main pulse laser beam need not be used. Still, the pre-pulse laser beam and the main pulse laser beam may strike the droplet DL and the diffused target respectively in substantially the same direction.

5. Third Embodiment

Figure 11:
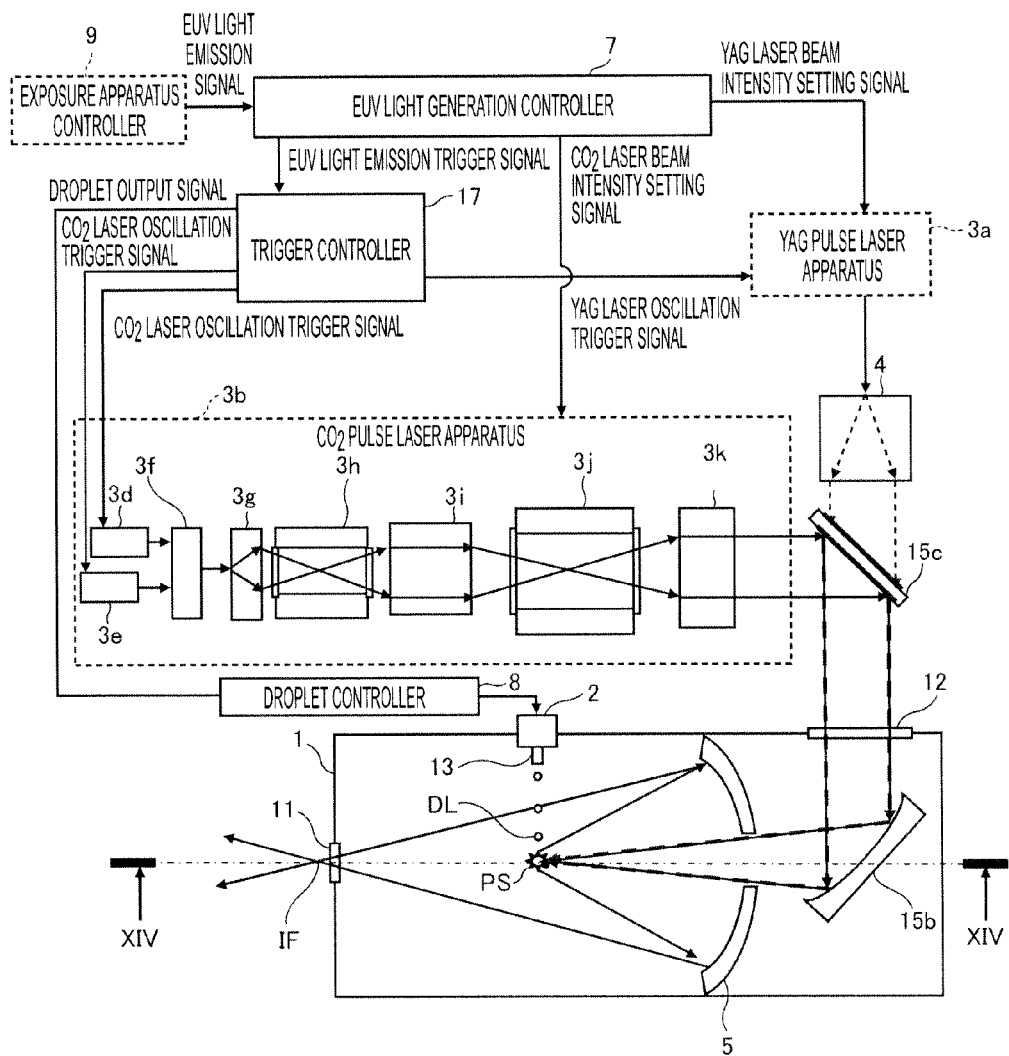
FIG. 11 schematically illustrates an exemplary configuration of an EUV light generation system according to a third embodiment.

FIG. 11 schematically illustrates an exemplary configuration of an EUV light generation system according to a third embodiment. In the EUV light generation system according to the third embodiment, a first pre-pulse laser beam from the YAG pulse laser apparatus 3a and a second pre-pulse laser beam and the main pulse laser beam from the $CO_2$ pulse laser apparatus 3b may be guided into the chamber 1.

The $CO_2$ pulse laser apparatus 3b may include the master oscillator 3d configured to output the seed beam of the main pulse laser beam and a master oscillator 3e configured to output a seed beam of the second pre-pulse laser beam. The seed beam of the second pre-pulse laser beam from the master oscillator 3e may be amplified by the preamplifier 3h and the main amplifier 3j to desired beam intensity. The amplified seed beam may be outputted from the $CO_2$ pulse laser apparatus 3b as the second pre-pulse laser beam, and then be incident on the beam combiner 15c. The seed beam of the main pulse laser beam from the master oscillator 3d may also be amplified by the preamplifier 3h and the main amplifier 3j to desired beam intensity. The amplified seed beam may be outputted from the $CO_2$ pulse laser apparatus 3b as the main pulse laser beam, and then be incident on the beam combiner 15c.

Each of the master oscillators 3d and 3e may be a semiconductor laser configured to oscillate in a bandwidth that can be amplified by a $CO_2$ gain medium. More specifically, each of the master oscillators 3d and 3e may include a plurality of quantum cascade lasers (QCL).

Figures 12A, 12B, 12C:
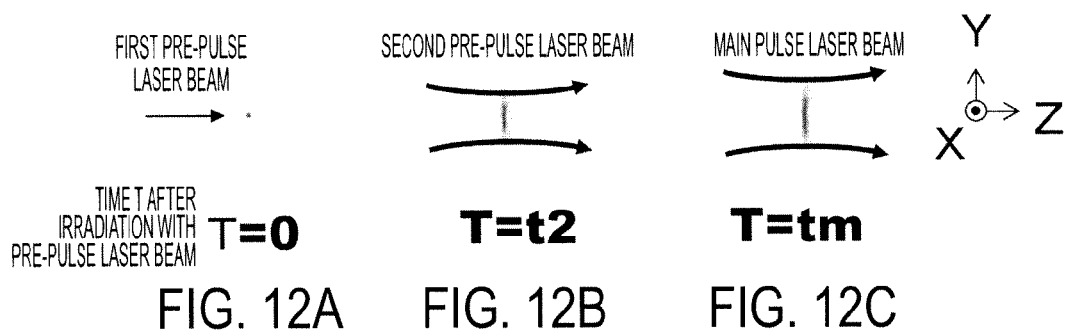
FIGS. 12A through 12F show a droplet being irradiated with a first pre-pulse laser beam and a diffused target being irradiated with a second pre-pulse laser beam.
Figures 12D, 12E, 12F:
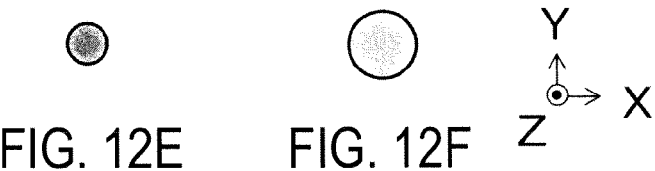

FIGS. 12A through 12F show a droplet DL being irradiated with a first pre-pulse laser beam and a diffused target being irradiated with a second pre-pulse laser beam in the third embodiment. In each of FIGS. 12A through 12C, the droplet or the diffused target is viewed in a direction (X-direction) perpendicular to the beam axes of the first and second pre-pulse laser beams (Z-direction). FIGS. 12A through 12C respectively show the states of the target material at delay times T=0, T=t2, and T=tm (where, 0<t2<tm) after the droplet is irradiated with the first pre-pulse laser beam. In each of FIGS. 12D through 12F, the droplet or the diffused target is viewed in the direction of the beam axes of the first and second pre-pulse laser beams (Z-direction). FIGS. 12D through 12F respectively show the states of the target material at delay times T=0, T=t2, and T=tm (where, 0<t2<tm) after the droplet is irradiated with the first pre-pulse laser beam.

When a droplet of the target material shown in FIGS. 12A and 12D is irradiated with the first pre-pulse laser beam, the droplet may be diffused as shown in FIGS. 12B and 12E so that a first diffused target may be formed. The first diffused target may be irradiated with the second pre-pulse laser beam when the first diffused target is diffused to a desired size that is substantially the same as or smaller than the irradiation spot size of the second pre-pulse laser beam.

When the first diffused target is irradiated with the second pre-pulse laser beam, the first diffused target may be broken into even smaller particles and be diffused to form a second diffused target. The second diffused target may be irradiated with the main pulse laser beam when the second diffused target is diffused to a desired size that is substantially the same as or smaller than the irradiation spot size of the main pulse laser beam.

Since the second diffused target, which includes smaller particles than those in the first diffused target, is irradiated with the main pulse laser beam, the energy of the main pulse laser beam may be absorbed by the second diffused target efficiently. Because a large portion of the second diffused target may be turned into plasma, a high CE may be obtained. Further, by controlling the irradiation spot size of the main pulse laser beam to substantially coincide with the diffusion diameter of the second diffused target, a high CE and debris reduction may both be achieved.

Note that, in the third embodiment, a mass limited target (e.g., a molten tin droplet having a diameter of 10 μm) may preferably be used.

In the third embodiment, the target material is irradiated with the first and second pre-pulse laser beams, and then the diffused target is irradiated with the main pulse laser beam. However, this disclosure is not limited thereto, and the target material may be irradiated with three or more pre-pulse laser beams.

Further, in the third embodiment, the first pre-pulse laser beam is outputted from the YAG pulse laser apparatus 3a, and the second pre-pulse laser beam and the main pulse laser beam are outputted from the $CO_2$ pulse laser apparatus 3b. However, this disclosure is not limited thereto, and all the laser beams may be outputted, for example, from a $CO_2$ laser apparatus.

Alternatively, the first and second pre-pulse laser beams may be outputted from a first laser apparatus, and the main pulse laser beam may be outputted from a second laser apparatus. Here, the first laser apparatus may be a YAG laser apparatus or a fiber laser apparatus, and the second laser apparatus may be a $CO_2$ laser apparatus.

Figure 13:
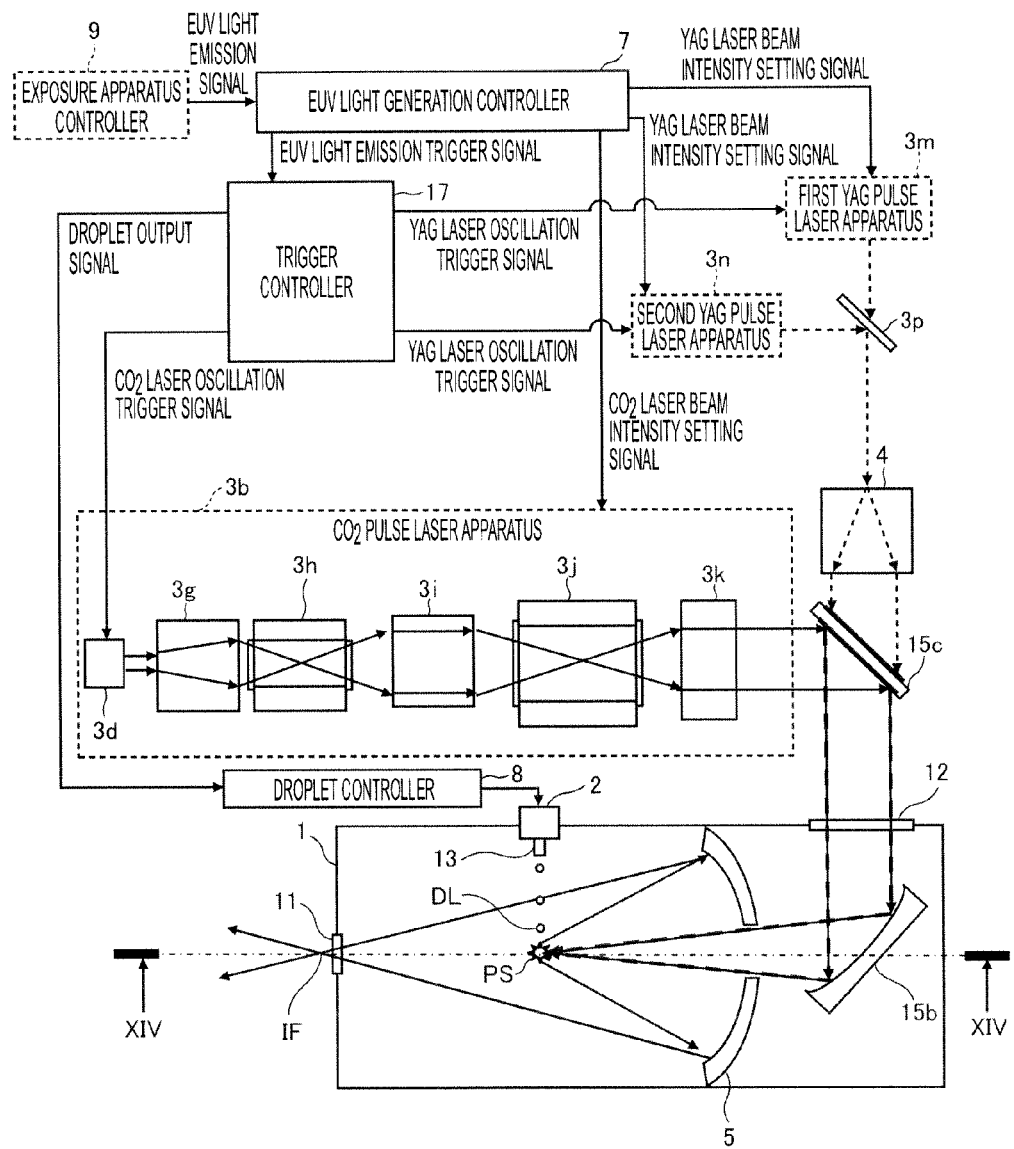
FIG. 13 schematically illustrates an exemplary configuration of an EUV light generation system according to a modification of the third embodiment.

FIG. 13 schematically illustrates an exemplary configuration of an EUV light generation system according to a modification of the third embodiment. The EUV light generation system shown in FIG. 13 may include a first YAG pulse laser apparatus 3m, a second YAG pulse laser apparatus 3n, and a beam combiner 3p.

The first and second YAG pulse laser apparatuses 3m and 3n may each receive the YAG laser beam intensity setting signal from the EUV light generation controller 7 and the YAG laser oscillation trigger signal from the trigger controller 17. The first YAG pulse laser apparatus 3m may be configured to output the first pre-pulse laser beam, and the first pre-pulse laser beam may be incident on the beam combiner 3p. The second YAG pulse laser apparatus 3n may be configured to output the second pre-pulse laser beam, and the second pre-pulse laser beam may also be incident on the beam combiner 3p. The beam combiner 3p may be positioned to make the beam paths of the first and second pre-pulse laser beams coincide with each other and output the first and second pre-pulse laser beams toward the beam expander 4.

Even with this configuration, as in the third embodiment described with reference to FIG. 11, the first and second pre-pulse laser beams and the main pulse laser beam may be guided into the chamber 1. Here, the first and second pre-pulse laser beams may respectively be outputted from first and second fiber laser apparatuses.

6. Fourth Embodiment

Figure 14:
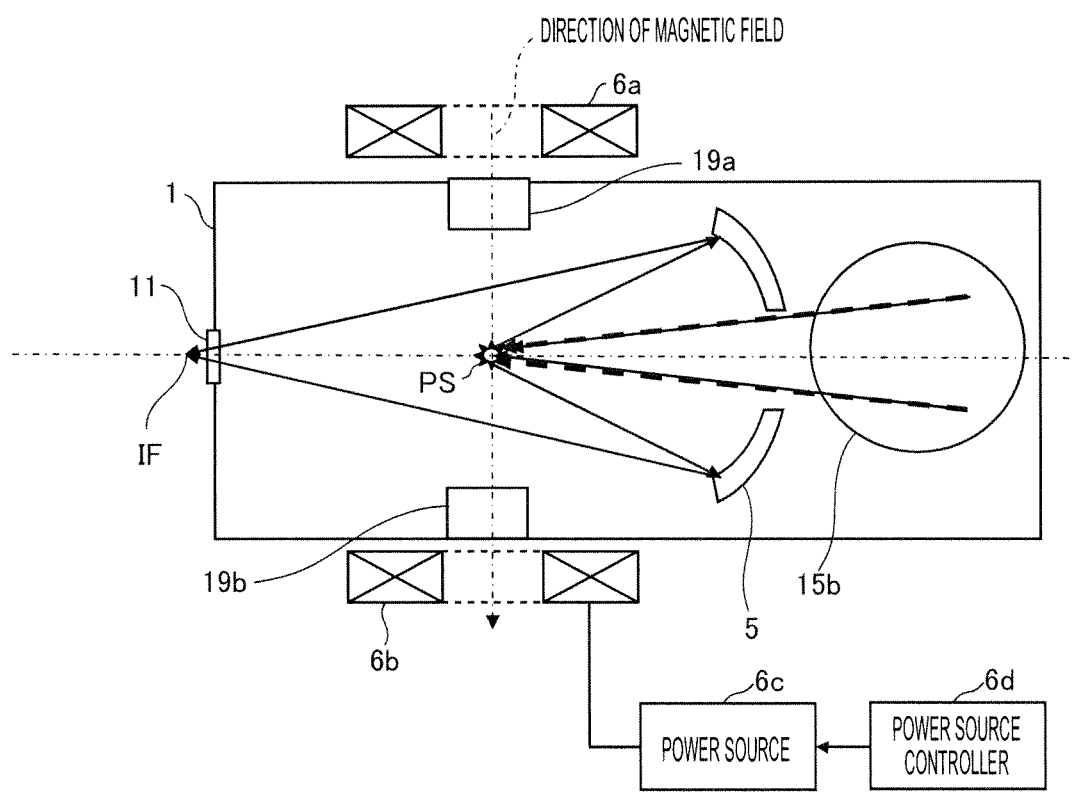
FIG. 14 schematically illustrates an exemplary configuration of an EUV light generation system according to a fourth embodiment.

FIG. 14 schematically illustrates an exemplary configuration of an EUV light generation system according to a fourth embodiment. FIG. 14 shows a sectional view taken along XIV-XIV plane in any of FIGS. 9 through 11 and 13. An EUV light generation system according to the fourth embodiment may be similar in configuration to any one of the first through third embodiments but may differ in that the EUV light generation system of the fourth embodiment may further include magnets 6a and 6b. A magnetic field may be generated with the magnets 6a and 6b inside the chamber 1 and ions generated inside the chamber 1 may be collected by the magnetic field.

Each of the magnets 6a and 6b may be an electromagnet that includes a coil winding and a cooling mechanism of the coil winding. A power source 6c that is controlled by a power source controller 6d may be connected to each of the magnets 6a and 6b. The power source controller 6d may regulate current to be supplied to the magnets 6a and 6b from the power source 6c so that a magnetic field in a predetermined direction may be generated in the chamber 1. A superconductive magnet, for example, may be used as each of the magnets 6a and 6b. Although two magnets 6a and 6b are used in this embodiment, a single magnet may be used. Alternatively, a permanent magnet may be provided in the chamber 1.

Plasma generated when a target material is irradiated with a main pulse laser beam may include positive ions and negative ions (or electrons). The positive and negative ions moving inside the chamber 1 may be subjected to Lorentz force in the magnetic field, and thus the ions may move in spiral along magnetic lines of force. With this, the ionized target material may be trapped in the magnetic field and collected into ion collection units 19a and 19b provided in the magnetic field. Accordingly, debris inside the chamber 1 may be reduced, and deterioration in optical element, such as the EUV collector mirror 5, due to the debris adhering to the optical element may be suppressed. In FIG. 14, the magnetic field is in the direction shown by an arrow, but a similar function can be achieved even when the magnetic field is oriented in the opposite direction.

A mitigation technique for reducing debris adhering to the optical element is not limited to the use of the magnetic field. Alternatively, a substance deposited onto the EUV collector mirror 5 may be etched using an etching gas. Debris may be made to react with hydrogen gas ($H_2$) or a hydrogen radical (H) in the magnetic field, and the debris may be removed as a vaporized compound.

7. Fifth Embodiment

Figure 15:
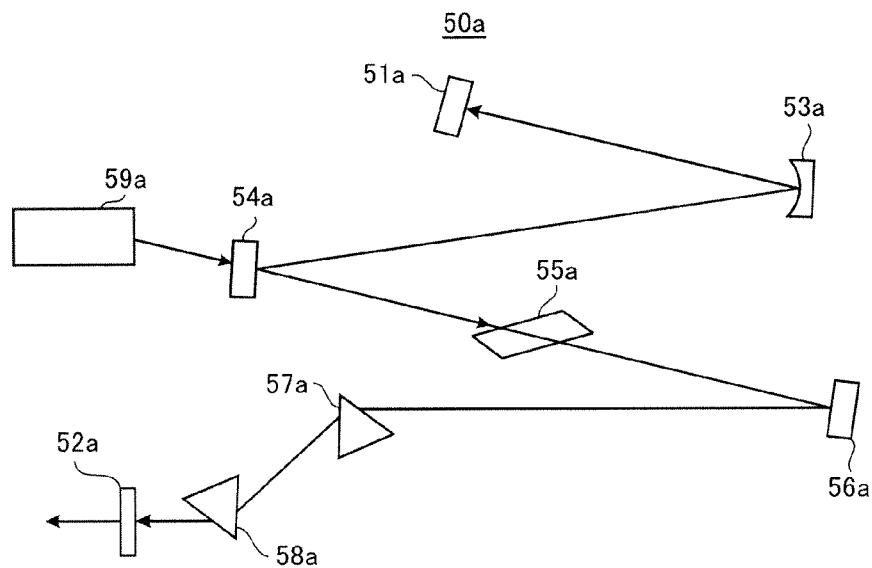
FIG. 15 schematically illustrates an exemplary configuration of a Ti:sapphire laser configured to output a pre-pulse laser beam in an EUV light generation system according to a fifth embodiment.

FIG. 15 schematically illustrates an exemplary configuration of a Ti:sapphire laser configured to output the pre-pulse laser beam in an EUV light generation system according to a fifth embodiment. A Ti:sapphire laser 50a of the fifth embodiment may be provided outside the chamber 1 as a driver laser for outputting the pre-pulse laser beam in any one of the first through fourth embodiments.

The Ti:sapphire laser 50a may include a laser resonator formed by a semiconductor saturable absorber mirror 51a and an output coupler 52a. A concave mirror 53a, a first pumping mirror 54a, a Ti:sapphire crystal 55a, a second pumping mirror 56a, and two prisms 57a and 58a are provided in this order from the side of the semiconductor saturable absorber mirror 51a in the optical path in the laser resonator. Further, the Ti:sapphire laser 50a may include a pumping source 59a for introducing a pumping beam into the laser resonator.

The first pumping mirror 54a may be configured to transmit the pumping beam from the outside of the laser resonator with high transmittance and reflect the laser beam inside the laser resonator with high reflectance. The Ti:sapphire crystal 55a may serve as a laser medium that undergoes stimulated emission with the pumping beam. The two prisms 57a and 58a may selectively transmit a laser beam at a predetermined wavelength. The output coupler 52a may transmit a part of the laser beam amplified in the laser resonator and output the amplified laser beam from the laser resonator, and reflect the remaining part of the laser beam back into the laser resonator. The semiconductor saturable absorber mirror 51a may have a reflective layer and a saturable absorber layer laminated thereon. A part of an incident laser beam of low beam intensity may be absorbed by the saturable absorber layer, and another part of the incident laser beam of high beam intensity may be transmitted through the saturable absorber layer and reflected by the reflective layer. With this, the pulse duration of the incident laser beam may be shortened.

A semiconductor pumped $Nd:YVO_4$ laser may, for example, be used as the pumping source 59a. The second harmonic wave from the pumping source 59a may be introduced into the laser resonator through the first pumping mirror 54a. The position of the semiconductor saturable absorber mirror 51a may be adjusted so as to adjust the resonator length for a predetermined longitudinal mode. With this mode-locking of the Ti:sapphire laser 50a, a picosecond pulse laser beam may be outputted through the output coupler 52a. Here, when the pulse energy is small, the pulse laser beam may be amplified by a regenerative amplifier.

According to the fifth embodiment, a target material may be irradiated with a picosecond pulse laser beam or a pulse laser beam having a shorter pulse duration. When the target material is irradiated with a short pulse laser beam, thermal diffusion at the irradiation portion may be made extremely small. Accordingly, energy that may be diffused can be used for the ablation effect. As a result, according to the fifth embodiment, compared to the nanosecond pulse laser beam, a droplet may be diffused with smaller pulse energy.

8. Sixth Embodiment

Figure 16:
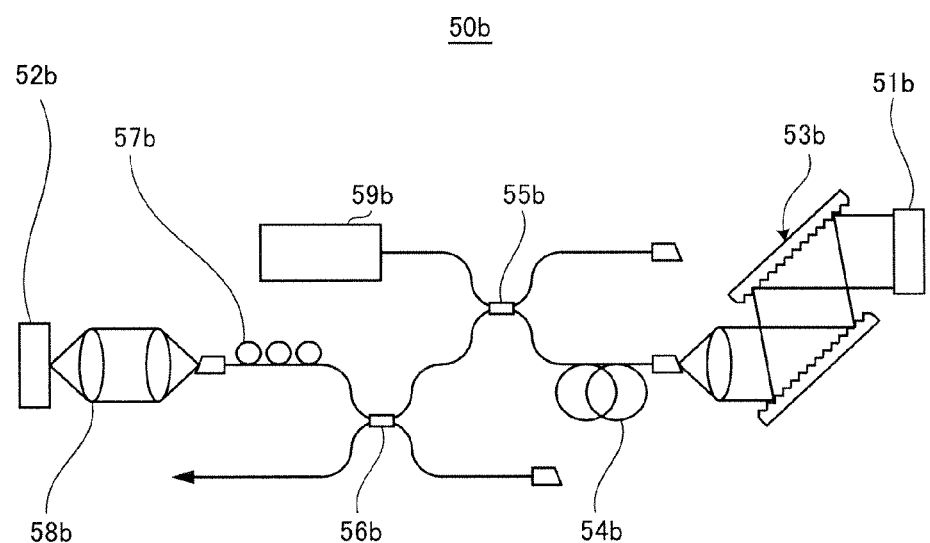
FIG. 16 schematically illustrates an exemplary configuration of a fiber laser configured to output a pre-pulse laser beam in an EUV light generation system according to a sixth embodiment.

FIG. 16 schematically illustrates an exemplary configuration of a fiber laser configured to output the pre-pulse laser beam in an EUV light generation system according to a sixth embodiment. A fiber laser 50b of the sixth embodiment may be provided outside the chamber 1 as a driver laser for outputting the pre-pulse laser beam in any one of the first through fourth embodiments.

The fiber laser 50b may include a laser resonator formed by a high-reflection mirror 51b and a semiconductor saturable absorber mirror 52b. A grating pair 53b, a first polarization maintenance fiber 54b, a multiplexer 55b, a separation element 56b, a second polarization maintenance fiber 57b, and a focusing optical system 58b may be provided in this order from the side of the high-reflection mirror 51b in the beam path in the laser resonator. Further, the fiber laser 50b may include a pumping source 59b for introducing a pumping beam into the laser resonator.

The multiplexer 55b may be configured to introduce the pumping beam from the pumping source 59b to the first polarization maintenance fiber 54b and may transmit a laser beam traveling back and forth between the first polarization maintenance fiber 54b and the second polarization maintenance fiber 57b. The first polarization maintenance fiber 54b may be doped with ytterbium (Yb), and may undergo stimulated emission with the pumping beam. The grating pair 53b may selectively reflect a laser beam at a predetermined wavelength. The semiconductor saturable absorber mirror 52b may be similar in configuration and function to the semiconductor saturable absorber mirror 51b in the fifth embodiment. The separation element 56b may separate a part of the laser beam amplified in the laser resonator and output the separated laser beam from the laser resonator and return the remaining part of the laser beam back into the laser resonator. This configuration may lead to mode-locking of the fiber laser 50b. When the pumping beam from the pumping source 59b is introduced into the multiplexer 55b through an optical fiber, a picosecond pulse laser beam may be outputted through the separation element 56b.

According to the sixth embodiment, in addition to the effect similar to that of the fifth embodiment, the target material may be irradiated with the pre-pulse laser beam with high precision since the pre-pulse laser beam is introduced through an optical fiber. Further, generally, in a fiber laser, the $M^2$ value that expresses deviation from an ideal Gaussian distribution of the laser beam intensity distribution is approximately 1.2. The $M^2$ value being closer to 1 means that the focusing performance is high. Accordingly, when a fiber laser is used, a small target may be irradiated with a pre-pulse laser beam with high precision.

The shorter the wavelength of a laser beam, the higher the absorptivity of the laser beam by tin. Accordingly, when the priority is placed on the absorptivity of the laser beam by tin, a laser beam at a shorter wavelength may be advantageous. For example, compared to the fundamental harmonic wave outputted from an Nd:YAG laser apparatus at a wavelength of 1064 nm, the absorptivity may increase with the second harmonic wave (a wavelength of 532 nm), further with the third harmonic wave (a wavelength of 355 nm), and even further with the fourth harmonic wave (a wavelength of 266 nm).

Here, an example where a picosecond pulse laser beam is used is shown. However, similar effects can be obtained even with a femtosecond pulse laser beam. Further, a droplet can be diffused even with a nanosecond pulse laser beam. For example, a fiber laser with such specifications as a pulse duration of approximately 15 ns, a repetition rate of 100 kHz, pulse energy of 1.5 mJ, a wavelength of 1.03 μm, and the $M^2$ value of below 1.5 may be used as a pre-pulse laser apparatus.

9. Irradiation Conditions of Laser Beam

FIGS. 17A and 17B are tables showing irradiation conditions of the laser beams in the EUV light generation system in any one of the embodiments. When irradiation pulse energy is E (J), a pulse duration is T (s), and an irradiation spot size is Dm (m), beam intensity W (W/m²) of the laser beam may be expressed in Expression 5 below.

$$W = E/(T(Em/2)^2 \pi) \quad (5)$$

FIG. 17A shows four examples (case 1 through case 4) of irradiation conditions of the pre-pulse laser beam. In the case 1, the diameter of a molten tin droplet is 60 μm. The irradiation conditions for diffusing such a droplet and generating a desired diffused target may be as follows. For example, when the irradiation spot size Dm is 100 μm, the beam intensity W of the laser beam at $1.6 \times 10^9$ W/cm² is required. In that case, the irradiation pulse energy E may be set to 1.9 mJ, and the pulse duration T may be set to 15 ns. With such a pre-pulse laser beam, a diffused target as shown in FIG. 3B may be generated.

In the case 2 shown in FIG. 17A, the diameter of a molten tin droplet is 10 μm (i.e., a mass-limited target). The irradiation conditions for diffusing such a droplet and generating a desired diffused target may be as follows. For example, when the irradiation spot size Dm is 30 μm, the beam intensity W of the laser beam at $1.6 \times 10^9$ W/cm² is required. In that case, the irradiation pulse energy E may be set to 0.17 mJ, and the pulse duration T may be set to 15 ns. With such a pre-pulse laser beam, a diffused target as shown in FIG. 7B may be generated.

In the cases 3 and 4 shown in FIG. 17A, the laser apparatus as shown in FIG. 15 or 16 is used for outputting the pre-pulse laser beam. Further, in the cases 3 and 4, the droplet is a mass-limited target, and the beam intensity W of the laser beam at $1 \times 10^{10}$ W/cm² is required.

FIG. 17B shows four examples (case 1 through case 4) of irradiation conditions of the main pulse laser beam. In the case 1, the diffusion diameter of a diffused target is 250 μm. Irradiation conditions for turning such a diffused target into plasma may be as follows. For example, when the irradiation spot size Dm is 250 μm, the beam intensity W of the laser beam at $1.0 \times 10^{10}$ W/cm² is required. In that case, the irradiation pulse energy E may be set to 100 mJ, and the pulse duration T may be set to 20 ns. Accordingly, energy required to turn the diffused target into plasma may be supplied to the diffused target.

In the case 2 shown in FIG. 17B, the diffusion diameter of the diffused target, the irradiation spot size Dm, and the beam intensity W of the laser beam are the same as in the case 1 shown in FIG. 17B. In that case, the irradiation pulse energy E may be set to 150 mJ, and the pulse duration T may be set to 30 ns. With this, energy required to turn the diffused target into plasma may be supplied to the diffused target.

In the case 3 shown in FIG. 17B, the diffusion diameter of a diffused target is 300 μm. Irradiation conditions for turning such a diffused target into plasma may be as follows. For example, when the irradiation spot size Dm is 300 μm, the beam intensity W of the laser beam at $1.1 \times 10^{10}$ W/cm$^2$ is required. In that case, the irradiation pulse energy E may be set to 200 mJ, and the pulse duration T may be set to 25 ns. Thus, energy required to turn the diffused target into plasma may be supplied to the diffused target.

In the case 4 shown in FIG. 17B, the diffusion diameter of a diffused target is 200 μm. Irradiation conditions for turning such a diffused target into plasma may be as follows. For example, when the irradiation spot size Dm is 200 μm, the beam intensity W of the laser beam at $1.2 \times 10^{10}$ W/cm$^2$ is required. In that case, the irradiation pulse energy E may be set to 200 mJ, and the pulse duration T may be set to 50 ns. With this, energy required to turn the diffused target into plasma may be supplied to the diffused target.

As described above, the beam intensity of the pre-pulse laser beam and the main pulse laser beam may be set by setting the irradiation pulse energy E and the pulse duration T of the laser beam.

10. Seventh Embodiment

Figure 18:
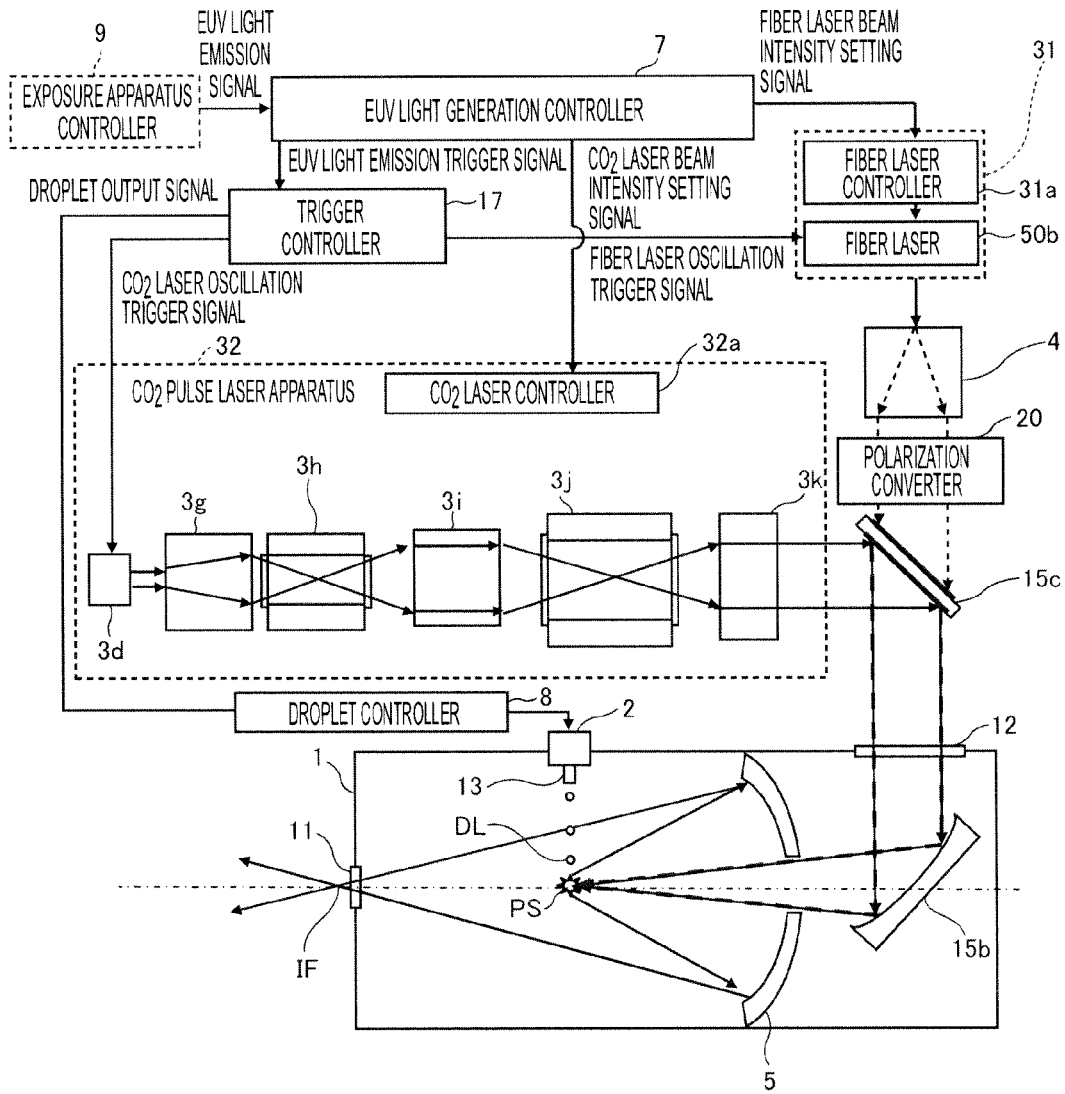
FIG. 18 schematically illustrates an exemplary configuration of an EUV light generation system according to a seventh embodiment.

FIG. 18 schematically illustrates an exemplary configuration of an EUV light generation system according to a seventh embodiment. In the EUV light generation system according to the seventh embodiment, the polarization state of the pre-pulse laser beam from a fiber laser apparatus 31 may be controlled by a polarization converter 20. The polarization converter 20 may be configured to change the polarization state of the pre-pulse laser beam into a state other than the linear polarization. The polarization converter 20 may be provided at a predetermined position in a beam path between the driver laser and the plasma generation region PS. In this disclosure, a polarization retarder is also included in the polarization converter.

In the seventh embodiment, the fiber laser apparatus 31 may include a fiber laser controller 31a and the fiber laser 50b described with reference to FIG. 16 (the sixth embodiment). A CO$_2$ pulse laser apparatus 32 may include a CO$_2$ laser controller 32a, the master oscillator 3d, the preamplifier 3h, the main amplifier 3j, and the relay optical systems 3g, 3i, and 3k as described with reference to FIG. 9 (the first embodiment).

The EUV light generation controller 7 may output a fiber laser beam intensity setting signal to the fiber laser controller 31a. Further, the EUV light generation controller 7 may output a CO$_2$ laser beam intensity setting signal to the CO$_2$ laser controller 32a.

The trigger controller 17 may output a fiber laser oscillation trigger signal to the fiber laser 50b. Further, the trigger controller 17 may output a CO$_2$ laser oscillation trigger signal to the master oscillator 3d.

The fiber laser 50b may be configured to output a pre-pulse laser beam at a first wavelength based on the fiber laser oscillation trigger signal. The fiber laser controller 31a may be configured to control the output intensity of the fiber laser 50b based on the fiber laser beam intensity setting signal. The pre-pulse laser beam from the fiber laser 50b may be expanded in diameter by the beam expander 4. Thereafter, the polarization state of the pre-pulse laser beam may be changed by the polarization converter 20, and then the pre-pulse laser beam may be incident on the beam combiner 15c.

The master oscillator 3d may be configured to output a seed beam at a second wavelength based on the CO$_2$ laser oscillation trigger signal. The CO$_2$ laser controller 32a may be configured to control the output intensity of the preamplifier 3h and the main amplifier 3j based on the CO$_2$ laser beam intensity setting signal. The seed beam from the master oscillator 3d may be amplified by the preamplifier 3h and the main amplifier 3j to desired beam intensity.

In the seventh embodiment, the fiber laser 50b is used to output the pre-pulse laser beam. This disclosure, however, is not limited thereto. For example, a YAG laser or a Ti:sapphire laser may be used to output the pre-pulse laser beam. Alternatively, in a configuration where two-stage irradiation with the first and second pre-pulse laser beams is employed, the first pre-pulse laser beam may be outputted from a fiber laser apparatus capable of achieving a small spot, and the second pre-pulse laser beam may be outputted from a YAG laser apparatus or a Ti:sapphire laser apparatus capable of outputting ultrashort pulse laser beam. Then, the main pulse laser beam may be outputted from a CO$_2$ laser apparatus capable of achieving high power laser beam. That is, a desired number of pre-pulse laser beams may be outputted from a plurality of separate laser apparatuses. Further, in accordance with the state of the diffused target at the time of being irradiated with the second pre-pulse laser beam, the diffused target may be irradiated with a plurality of pre-pulse laser beams respectively at different wavelengths, and with difference spot sizes, energy, and pulse durations.

10.1 Overview of Polarization Control

Figure 19A:
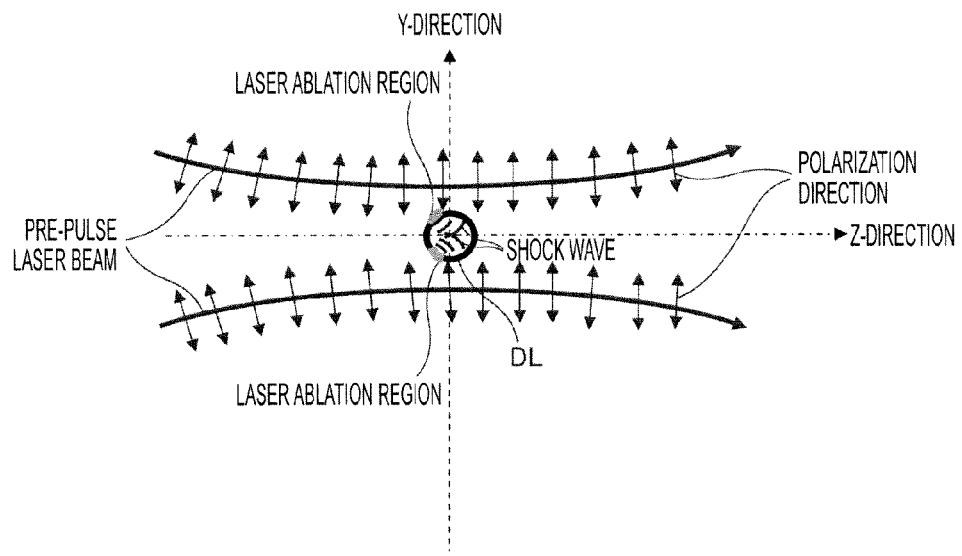
FIG. 19A is a conceptual diagram showing a droplet being irradiated with a linearly-polarized pre-pulse laser beam.
Figure 19B:
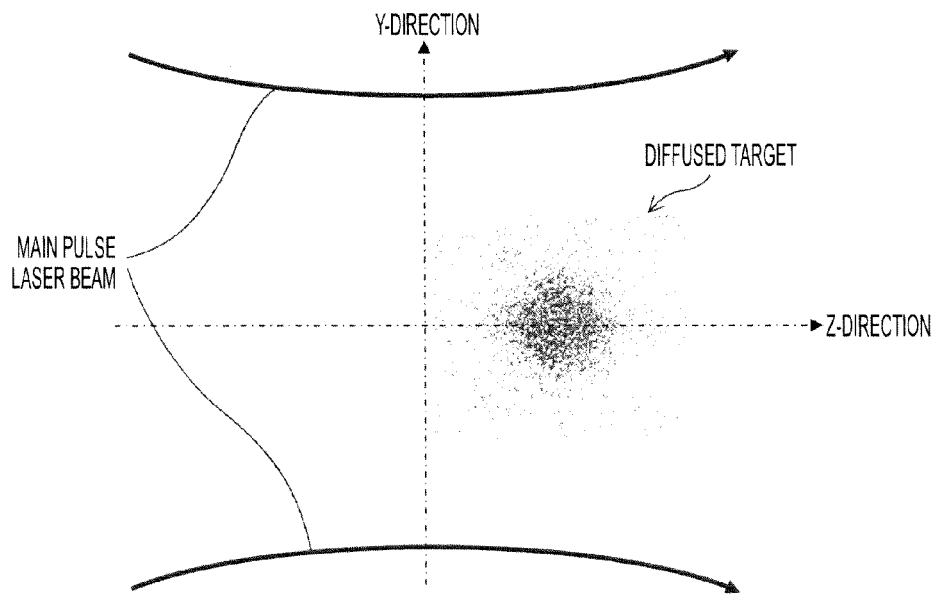
FIG. 19B shows the simulation result of diffusion of the droplet.
Figure 20A:
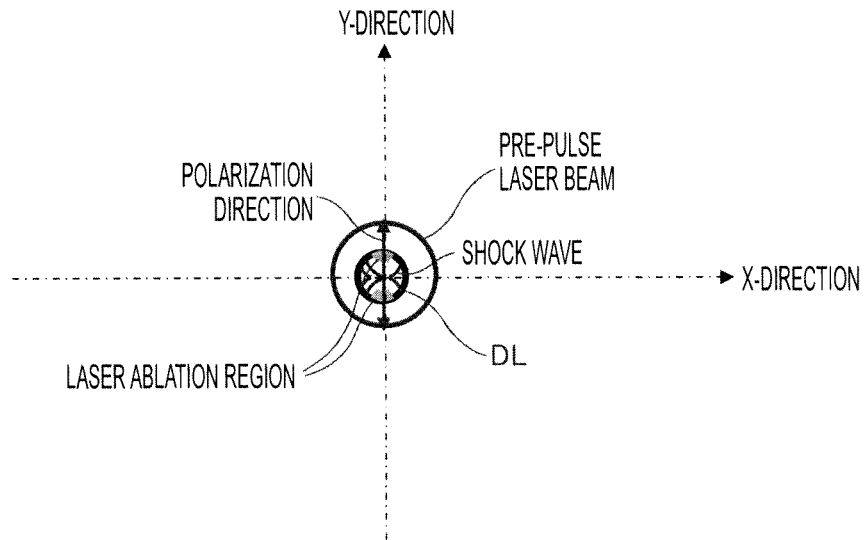
FIG. 20A is a conceptual diagram showing a droplet being irradiated with a linearly-polarized pre-pulse laser beam.
Figure 20B:
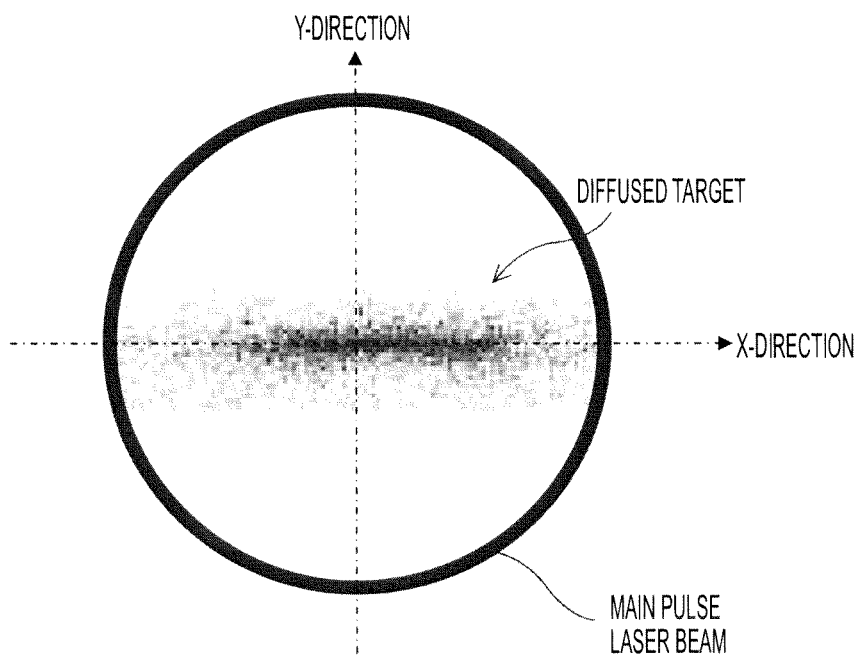
FIG. 20B shows the simulation result of diffusion of the droplet.

FIGS. 19A and 20A are conceptual diagrams showing a droplet being irradiated with a linearly-polarized pre-pulse laser beam. FIGS. 19B and 20B show the simulation result of a droplet being irradiated with a linearly-polarized pre-pulse laser beam. In FIGS. 19A and 19B, the droplet is viewed in a direction (X-direction) perpendicular to the polarization direction of the pre-pulse laser beam. In FIGS. 20A and 20B, the droplet is viewed in a direction of the beam axis (Z-direction) of the pre-pulse laser beam.

With reference to FIGS. 19A and 20A, a case where a droplet is irradiated with a linearly-polarized pre-pulse laser beam will be discussed. In this case, the droplet may be diffused, and as shown in FIGS. 19B and 20B, a diffused target may be generated. The simulation result reveals that the diffused target is diffused further in a direction (X-direction) perpendicular to the polarization direction (Y-direction) of the pre-pulse laser beam. When the diffused target diffused as such is irradiated with the main pulse laser beam traveling along substantially the same path as the pre-pulse laser beam, as shown in FIGS. 19B and 20B, the shape of the diffused target may differ largely from the cross-sectional shape of the main pulse laser beam. Accordingly, a large portion of the main pulse laser beam may not be used to generate plasma.

Figure 21:
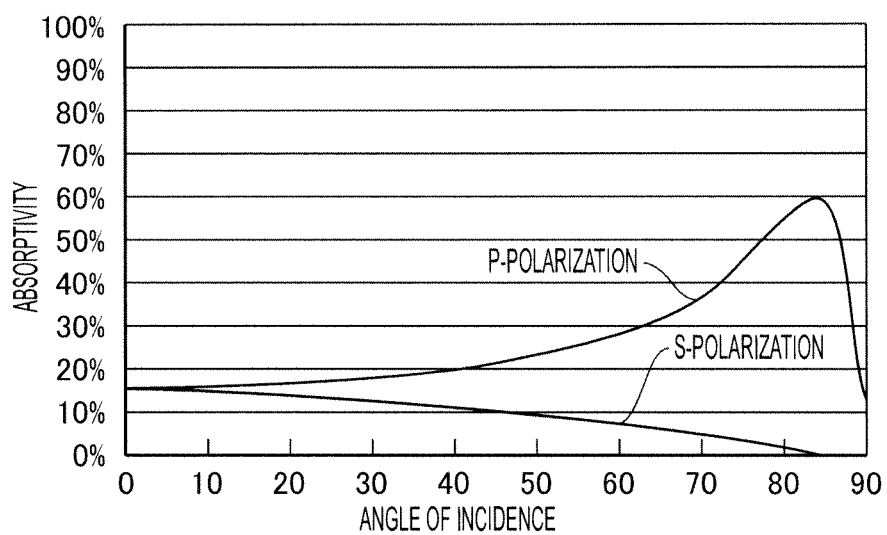
FIG. 21 is a graph showing absorptivity of a P-polarization component and an S-polarization component of a laser beam by a molten tin droplet.

Here, a reason why the diffused target is diffused largely in a direction (X-direction) perpendicular to the polarization direction of the linearly-polarized pre-pulse laser beam will be considered. FIG. 21 is a graph showing absorptivity of a P-polarization component and an S-polarization component of a laser beam incident on the surface of a molten tin droplet. In the case shown in FIG. 21, the wavelength of the laser beam is 1.06 μm. As shown in the graph, the absorptivity of the laser beam may depend on the angle of incidence and the polarization state of the laser beam.

The absorptivity of the P-polarization component of an incident laser beam is at the highest when the angle of incidence of the laser beam is 80 to 85 degrees, and gradually decreases as the angle of incidence shifts from that angle range. On the other hand, the absorptivity of the S-polarization component is substantially the same as that of the P-polarization component when the laser beam is incident on the surface of the molten tin droplet at substantially 0 degree (i.e., substantially normal incidence), and decreases as the angle of incidence increases. For example, when the angle of incidence is equal to or greater than 80 degrees, the absorptivity of the S-polarization component approximates to a.

Based on such absorptivity properties, it is speculated that energy of the laser beam is absorbed the most where a linearly-polarized laser beam is incident on the surface of the droplet as the P-polarization component at a degree within a range of 80 to 85 degrees. Portions of the droplet where the laser beam is incident thereon as the P-polarization component at an angle within the above range are areas toward the edges of the irradiation surface in the Y-direction (hereinafter, referred to as "laser ablation region"). That is, the absorptivity of the laser beam is high in these areas, and strong laser ablation may occur. As a result of the reaction of the laser ablation in the laser ablation regions, a shock wave may propagate toward the inside of the droplet from the laser ablation regions. This shock wave may propagate toward the edges of the droplet in the X-direction as shown in FIG. 20A, and the droplet may be diffused in the X-direction as shown in FIG. 20B.

Accordingly, in the seventh embodiment, the polarization state of the pre-pulse laser beam may be changed into a polarization state other than the linear polarization using the polarization converter 20. Further, by controlling the spot size of the pre-pulse laser beam to be equal to or greater than the diameter (e.g., 40 μm) of the droplet, the entire irradiation surface of the droplet may be irradiated with the pre-pulse laser beam. With this, the droplet may be diffused symmetrically about the beam axis of the pre-pulse laser beam, and the diffused target may be irradiated with the main pulse laser beam efficiently.

The polarization converter 20 may be configured to change the pre-pulse laser beam into a substantially circularly-polarized laser beam, a substantially unpolarized laser beam, a substantially radially-polarized laser beam, a substantially azimuthally-polarized laser beam, and so forth.

10.2 Examples of Polarization Control

Figure 22A:
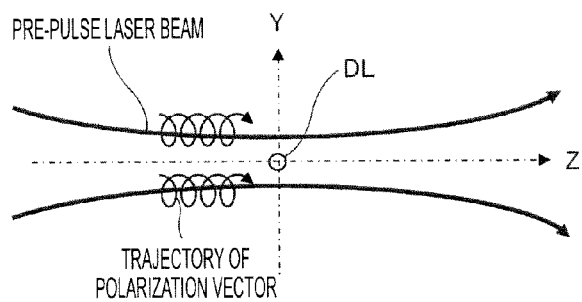
FIGS. 22A through 22F show a droplet being irradiated with a circularly-polarized pre-pulse laser beam and a diffused target being irradiated with a main pulse laser beam according to a seventh embodiment.
Figure 22B:
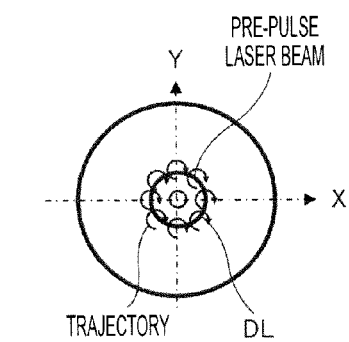
Figure 22C:
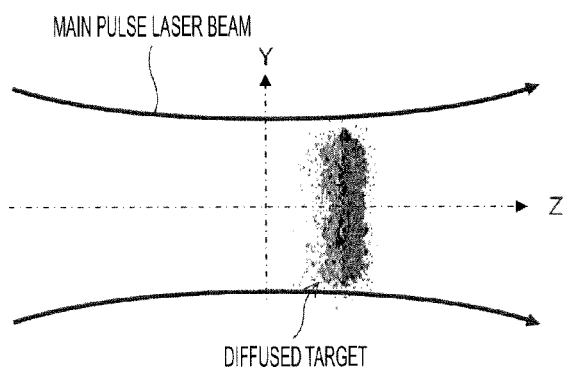
Figure 22D:
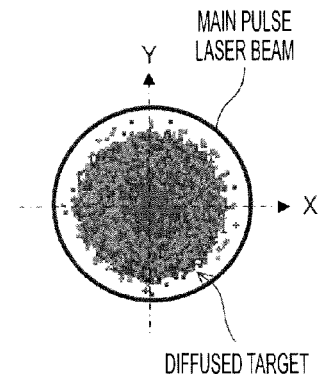
Figure 22E:
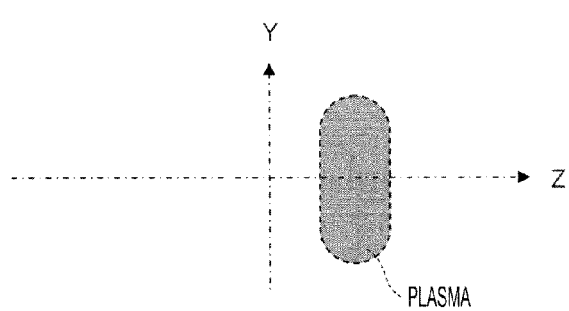
Figure 22F:
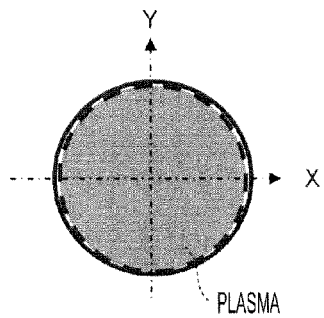

FIGS. 22A and 22B show a droplet being irradiated with a circularly-polarized pre-pulse laser beam. FIGS. 22C and 22D show a diffused target generated when the droplet is irradiated with the pre-pulse laser beam being irradiated with a main pulse laser beam. FIGS. 22E and 22F schematically show plasma generated when the diffused target is irradiated with the main pulse laser beam.

In a circularly-polarized laser beam, the polarization vector draws a circle on a plane (X-Y plane) perpendicular to the beam axis of the laser beam. Further, the polarization state of the pre-pulse laser beam is circular at any position along the X-Y plane (see FIGS. 22A and 22B). In the circularly-polarized laser beam, the ratio of an X-direction polarization component and a Y-direction polarization component is substantially 1:1. When a droplet is irradiated with the circularly-polarized pre-pulse laser beam, the distribution of absorptivity of the pre-pulse laser beam in the surface of the droplet may be symmetrical about the center axis of the droplet in the irradiation direction of the laser beam. As a result, the diffusion state of the droplet may be symmetrical about the center axis of the droplet, and the shape of the diffused target may become disc-like (see FIGS. 22C and 22D). This allows the shape of the diffused target to substantially coincide with the cross-sectional shape of the main pulse laser beam so that the main pulse laser beam may be absorbed efficiently by the diffused target.

FIGS. 23A and 23B show a droplet being irradiated with an unpolarized pre-pulse laser beam. FIGS. 23C and 23D show a diffused target generated when the droplet is irradiated with the pre-pulse laser beam being irradiated with a main pulse laser beam. FIGS. 23E and 23F schematically show plasma generated when the diffused target is irradiated with the main pulse laser beam.

The pre-pulse laser beam shown in FIG. 23B is substantially unpolarized. In such an unpolarized laser beam, the ratio of the X-direction polarization component and the Y-direction polarization component is substantially 1:1. When a droplet is irradiated with the unpolarized pre-pulse laser beam, the distribution of absorptivity of the pre-pulse laser beam in the surface of the droplet may be symmetrical about the center axis of the droplet in the irradiation direction of the laser beam. As a result, the diffusion state of the droplet may be symmetrical about the center axis of the droplet, and the shape of the diffused target may, for example, become disc-like. Accordingly, the main pulse laser beam may be absorbed by the diffused target efficiently.

Figure 24A:
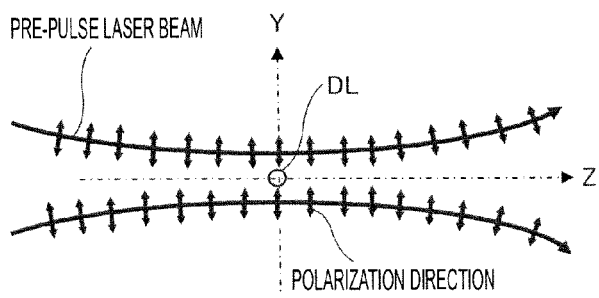
FIGS. 24A through 24F show a droplet being irradiated with a radially-polarized pre-pulse laser beam and a diffused target being irradiated with a main pulse laser beam according to the seventh embodiment.
Figure 24B:
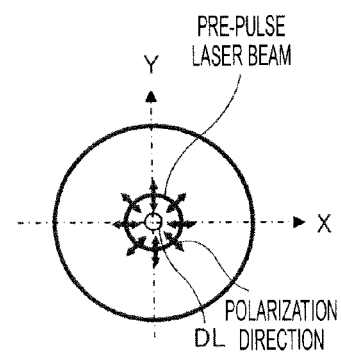
Figure 24C:
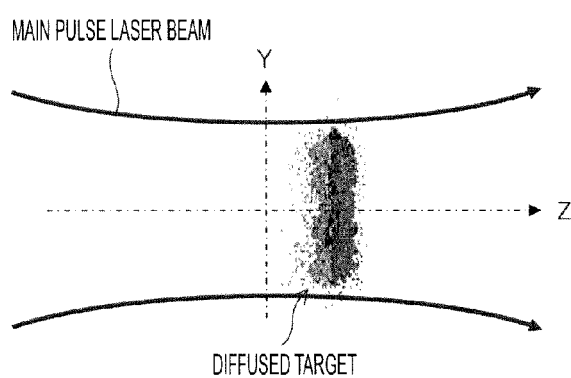
Figure 24D:
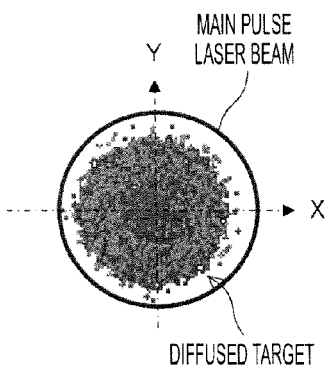
Figure 24E:
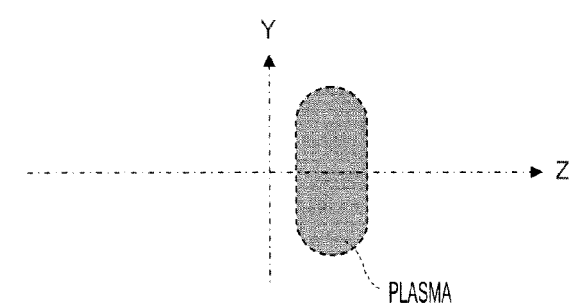
Figure 24F:
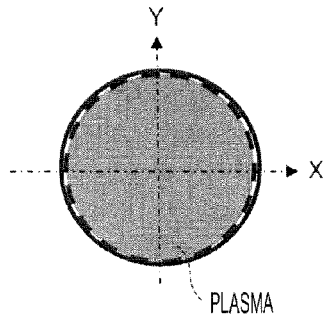

FIGS. 24A and 24B show a droplet being irradiated with a radially-polarized pre-pulse laser beam. FIGS. 24C and 24D show a diffused target generated when the droplet is irradiated with the pre-pulse laser beam being irradiated with a main pulse laser beam. FIGS. 24E and 24F schematically show plasma generated when the diffused target is irradiated with the main pulse laser beam.

When a droplet is irradiated with the radially-polarized pre-pulse laser beam, the distribution of absorptivity of the pre-pulse laser beam in the surface of the droplet may be symmetrical about the beam axis of the pre-pulse laser beam. Here, the beam axis of the pre-pulse laser beam preferably coincides with the center axis of the droplet. As a result, the diffusion state of the droplet may be symmetrical about the beam axis of the pre-pulse laser beam, and the shape of the diffused target may, for example, become disc-like. Accordingly, the main pulse laser beam may be absorbed by the diffused target efficiently.

Further, when the spot size of the pre-pulse laser beam is controlled to be equal to or greater than the diameter (e.g., 40 μm) of the droplet, the entire irradiation surface of the droplet may be irradiated with the pre-pulse laser beam incident thereon mostly as the P-polarization component. Accordingly, the absorptivity of the pre-pulse laser beam may be increased, and the energy required to generate a desired diffused target may be kept small.

Figure 25A:
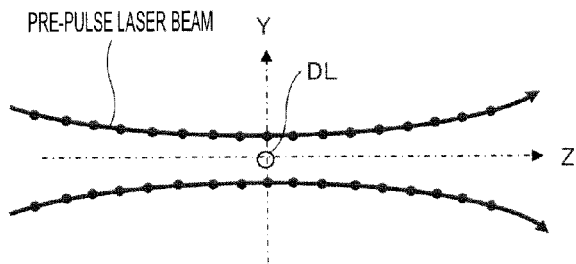
FIGS. 25A through 25F show a droplet being irradiated with an azimuthally-polarized pre-pulse laser beam and a diffused target being irradiated with a main pulse laser beam according to the seventh embodiment.
Figure 25B:
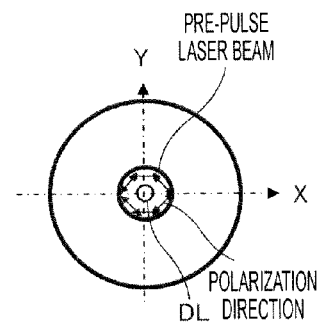
Figure 25C:
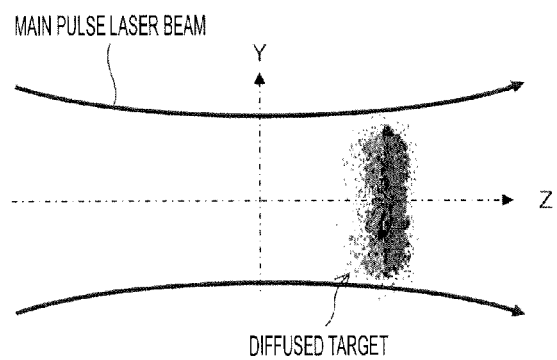
Figure 25D:
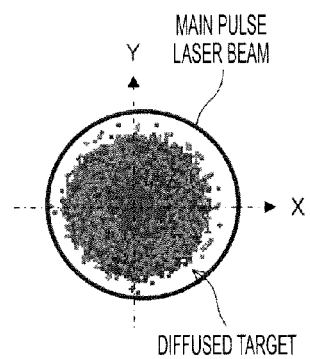
Figure 25E:
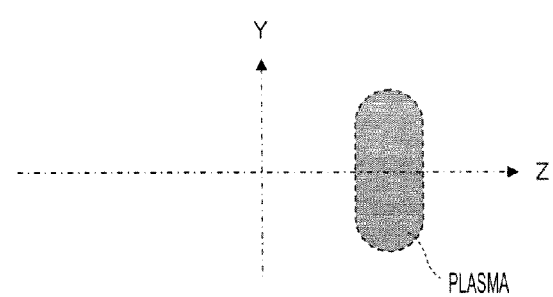
Figure 25F:
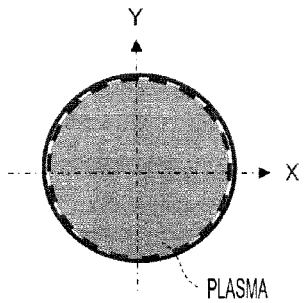

FIGS. 25A and 25B show a droplet being irradiated with an azimuthally-polarized pre-pulse laser beam. FIGS. 25C and 25D show a diffused target generated when the droplet is irradiated with the pre-pulse laser beam being irradiated with a main pulse laser beam. FIGS. 25E and 25F schematically show plasma generated when the diffused target is irradiated with the main pulse laser beam.

When a droplet is irradiated with the azimuthally-polarized pre-pulse laser beam, the distribution of absorptivity of the pre-pulse laser beam in the surface of the droplet may be symmetrical about the beam axis of the pre-pulse laser beam. Here, the beam axis of the pre-pulse laser beam preferably coincides with the center axis of the droplet. As a result, the diffusion state of the droplet may be symmetrical about the beam axis of the pre-pulse laser beam, and the shape of the diffused target may, for example, become disc-like. Accordingly, the main pulse laser beam may be absorbed by the diffused target efficiently.

In the seventh embodiment, the distribution of the absorptivity of the pre-pulse laser beam in the surface of the droplet is made symmetrical about the center axis of the droplet and/or the beam axis of the pre-pulse laser beam by controlling the polarization state of the pre-pulse laser beam. However, this disclosure is not limited thereto. The distribution of the absorptivity of the pre-pulse laser beam in the surface of the droplet need not be perfectly symmetrical about the beam axis, but may be substantially symmetrical. Accordingly, the polarization state of the pre-pulse laser beam may, for example, be elliptical as well.

Figure 26A:
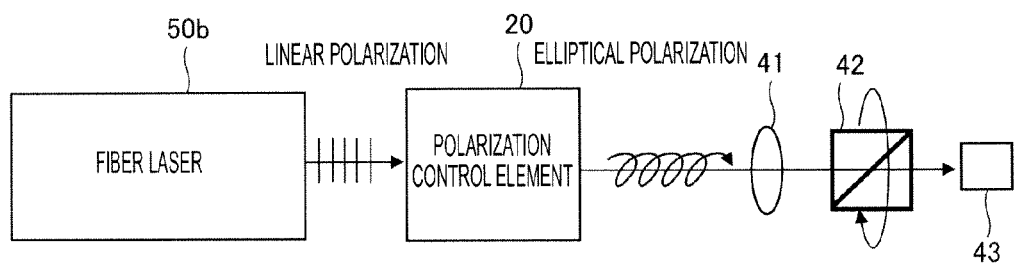
FIGS. 26A and 26B are diagrams for discussing a method for measuring the degree of linear-polarization.
Figure 26B:
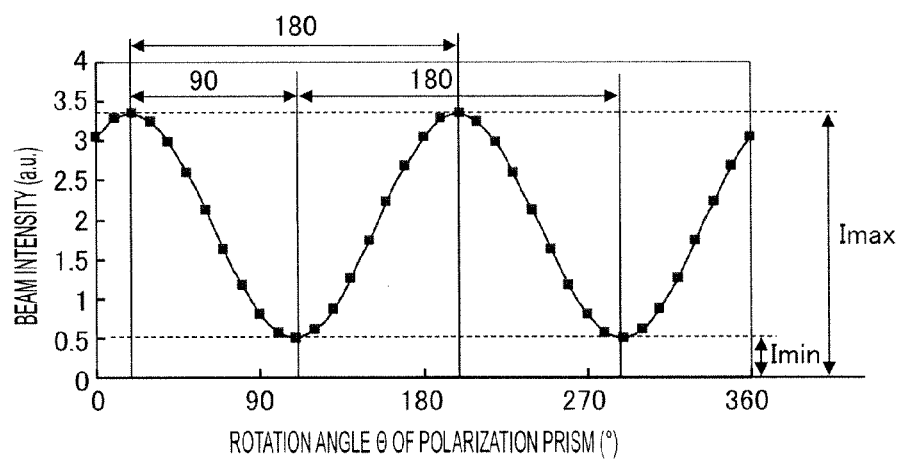

FIG. 26A schematically illustrates an exemplary configuration of a device for measuring the degree of linear polarization. The device may include a polarization prism and a beam intensity detector. FIG. 26B shows the relationship between the rotation angle of the polarization prism and the detection result of the beam intensity detector.

As shown in FIG. 26A, a linearly-polarized pre-pulse laser beam from the fiber laser 50b may be changed into an elliptically-polarized laser beam by the polarization converter 20. This elliptically-polarized laser beam may be focused by a focusing optical system 41 and made to be incident on the polarization prism 42. The beam intensity of the laser beam outputted from the polarization prism 42 may be detected by the beam intensity detector 43. The polarization prism 42 may be formed by bonding two refractive crystals such as calcite. The polarization prism 42 may be used to extract a laser beam of a predetermined polarization direction as an output laser beam from an input beam in accordance with the orientation of the bonding surface of the prism. As the polarization prism 42 is rotated about the beam axis of the pre-pulse laser beam, the polarization prism 42 may transmit a laser beam polarized in a direction corresponding to the rotation angle. In the description below, it is assumed that the polarization prism 42 may be an ideal prism having a sufficiently high extinction factor.

As shown in FIG. 26B, the beam intensity of the output beam from the polarization prism 42 may change periodically as the polarization prism 42 is rotated by 180 degrees. Here, as shown in Expression (6), the degree of linear polarization P may be obtained from a maximum value Imax and a minimum value Imin of the beam intensity.

$$P=(Imax-Imin)/(Imax+Imin)\times 100(\%) \qquad (6)$$

The degree of linear polarization P measured by the device shown in FIG. 26A may be substantially 0% for a laser beam of a polarization state that is substantially symmetrical about the beam axis (e.g., circularly-polarized laser beam, unpolarized laser beam, radially-polarized laser beam, azimuthally-polarized laser beam). On the other hand, the degree of linear polarization P may be substantially 100% for a linearly-polarized laser beam. Here, when the degree of linear polarization P is in the following ranges, the diffused target may be formed in a desired shape (e.g., disc-shape).

0%≤P<30% (preferable range)
0%≤P<20% (more preferable range)
0%≤P<10% (most preferable range)

These ranges may be adjusted with the extinction factor of the actually-used polarization prism 42 taken into consideration.

10.3 Examples of Polarization Converter

Figure 27:
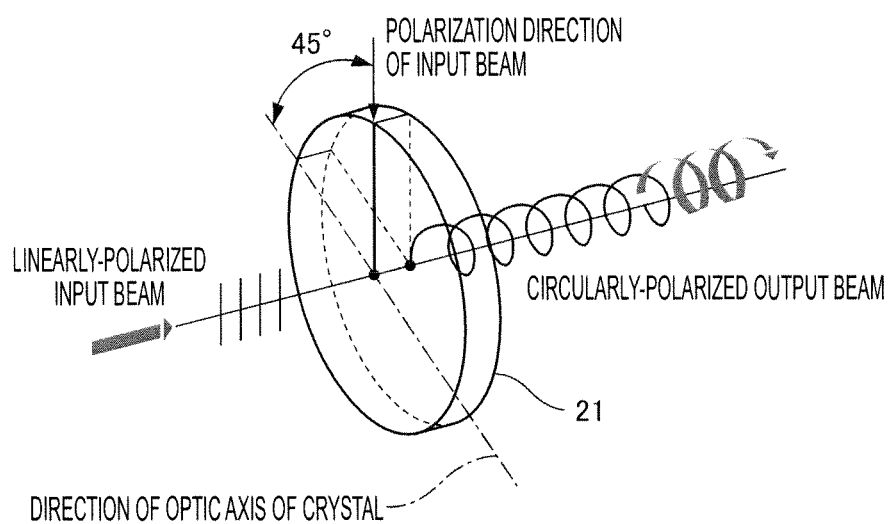
FIG. 27 shows a first example of a polarization converter in the seventh embodiment.

FIG. 27 shows a first example of a polarization converter in the seventh embodiment. In FIG. 27, a quarter-wave plate 21 for converting a linearly-polarized laser beam into a circularly-polarized laser beam may be used as the polarization converter.

The transmissive quarter-wave plate 21 may be a refractive crystal that provides a phase difference of π/2 between a polarization component parallel to the optic axis of the crystal and a polarization component perpendicular to the optic axis of the crystal. As shown in FIG. 27, a linearly-polarized laser beam may be converted into a circularly-polarized laser beam when the linearly-polarized laser beam is incident on the quarter-wave plate 21 such that the polarization direction thereof is inclined by 45 degrees with respect to the optic axis of the quarter-wave plate 21. When the polarization direction of the linearly-polarized laser beam is inclined by 45 degrees in the other direction, the rotation direction of the circular polarization is reversed. This disclosure is not limited to the transmissive quarter-wave plate 21, and a reflective quarter-wave plate may be used as well.

Figure 28A:
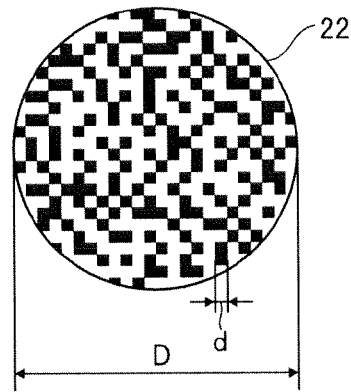
FIGS. 28A through 28C show a second example of a polarization converter in the seventh embodiment.
Figure 28B:
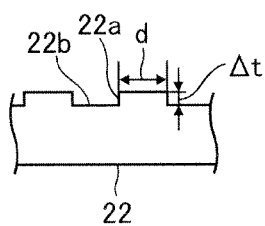
Figure 28C:
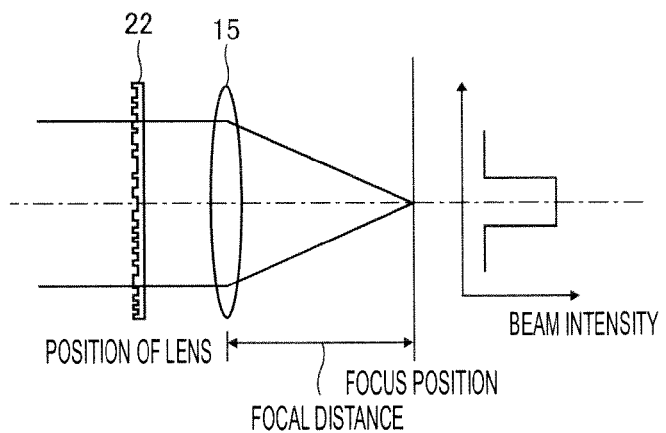

FIGS. 28A through 28C show a second example of a polarization converter in the seventh embodiment. FIG. 28A is a front view of the polarization converter, FIG. 28B is an enlarged fragmentary sectional view of the polarization converter taken along a radial direction plane, and FIG. 28C shows one mode for the use of the polarization converter. In FIGS. 28A through 28C, a random phase plate 22 for converting a linearly-polarized laser beam into an unpolarized laser beam may be used as the polarization control apparatus.

The transmissive random phase plate 22 may be a transmissive optical element having a diameter D, on whose input or output surface minute square regions each having a length d on each side are formed by randomly arranged recesses and protrusions. The random phase plate 22 may divide an input beam having the diameter D into small square beams each having the length d on each side. With this configuration, the random phase plate 22 may provide a phase difference of n between a small beam transmitted through a protrusion 22a and a small beam transmitted through a recess 22b. The phase difference n may be provided by setting a step Δt between the protrusion 22a and the recess 22b as in Expression (7) below, where the wavelength of the incident laser beam is λ, and the refractive index of the random phase plate 22 is $n_1$.

$$\Delta t=\lambda/2(n_1-1) \qquad (7)$$

As shown in FIG. 28C, the transmissive random phase plate 22 may, for example, be provided between the pre-pulse laser apparatus and the focusing optical system 15. A linearly-polarized laser beam may be incident on the random phase plate 22, and the laser beam transmitted through the random phase plate 22 may become unpolarized. Laser beams polarized in directions perpendicular to each other do not interfere. Accordingly, when this laser beam is focused by the focusing optical system 15, the cross-sectional beam intensity distribution at the focus may not be Gaussian but may be closer to the top-hat distribution. When a droplet is irradiated with such a pre-pulse laser beam, the droplet may be diffused substantially symmetrically about the center axis of the droplet. Accordingly, the diffused target may become disc-shaped, and the main pulse laser beam may be absorbed by the diffused target efficiently.

This disclosure is not limited to the transmissive random phase plate 22, and a reflective random phase plate may be used instead. Further, the protrusion 22a and the recess 22b may be in any other polygonal shapes, such as a hexagonal shape, a triangular shape.

Figure 29A:
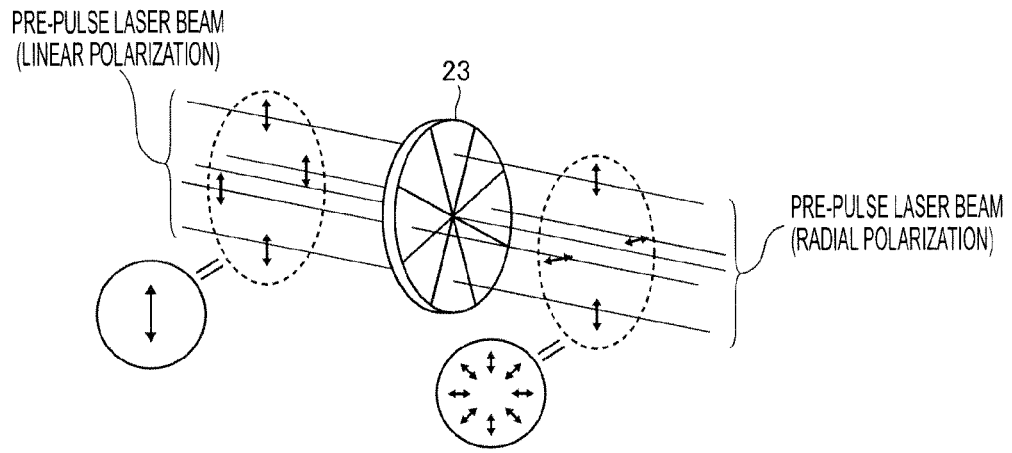
FIGS. 29A and 29B show a third example of a polarization converter in the seventh embodiment.
Figure 29B:
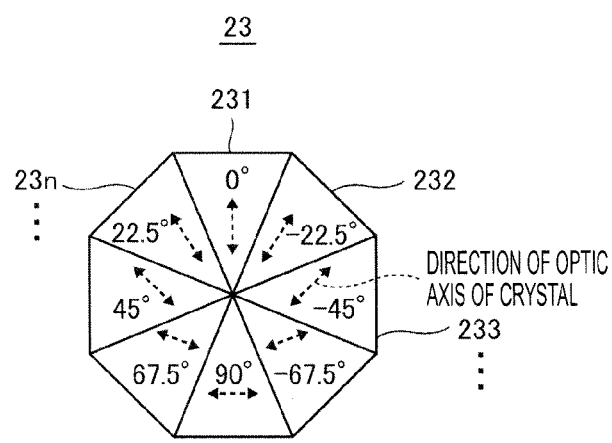

FIGS. 29A and 29B show a third example of a polarization converter in the seventh embodiment. FIG. 29A is a perspective view of the polarization converter, and FIG. 29B is a front view of the polarization converter. FIGS. 29A and 29B show an n-divided wave plate 23 for converting a linearly-polarized laser beam into a radially-polarized laser beam.

The n-divided wave plate 23 may be a transmissive optical element in which n triangular half-wave plates 231, 232, ..., 23n are arranged symmetrically about the beam axis of the laser beam. Each of the half-wave plates 231, 232, ..., 23n may be a refractive crystal that provides a phase difference of n between a polarization component parallel to the optic axis of the crystal and a polarization component perpendicular to the optic axis of the crystal. When a linearly-polarized laser beam is incident on such a half-wave plate perpendicularly such that the polarization direction is inclined by an angle θ with respect to the optic axis of the half-wave plate, the laser beam may be outputted from the half-wave plate with its polarization direction being rotated by 2θ.

For example, the half-wave plate 231 and the half-wave plate 233 may be arranged so that their respective optic axes make an angle of 45 degrees. Then, the polarization direction of the linearly-polarized laser beam transmitted through the half-wave plate 231 and the polarization direction of the linearly-polarized laser beam transmitted through the half-wave plate 233 may differ by 90 degrees. In this way, the polarization direction of the incident laser beam may be changed in accordance with an angle formed by the optic axis of the half-wave plate and the polarization direction of the incident laser beam. With this, the polarization directions of the laser beams transmitted through the respective half-wave plates may be changed to predetermined polarization directions. As a result, the n-divided wave plate 23 may convert a linearly-polarized laser beam into a radially-polarized laser beam. Further, by changing the arrangement of the half-wave plates in the n-divided wave plate 23, a linearly-polarized laser beam may be converted into an azimuthally-polarized laser beam as well.

Figure 30:
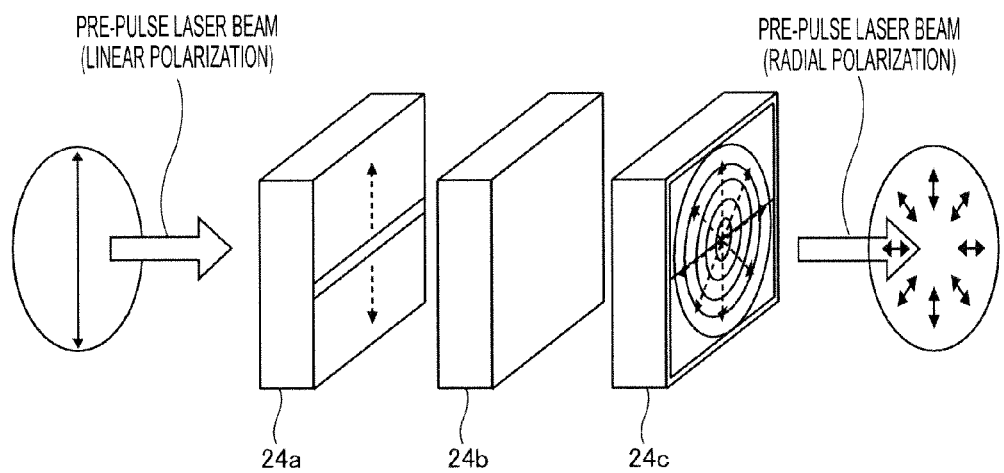
FIG. 30 shows a fourth example of a polarization converter in the seventh embodiment.

FIG. 30 shows a fourth example of a polarization converter in the seventh embodiment. FIG. 30 shows a phase compensator 24a, a polarization rotator 24b, and a theta cell 24c for converting a linearly-polarized laser beam into a radially-polarized laser beam.

The theta cell 24c may be an optical element into which a twisted nematic (TN) liquid crystal is injected, and the liquid crystal molecules are arranged so as to be twisted from the input side toward the output side. A linearly-polarized laser beam incident on the theta cell 24c may be rotated along the twist of the alignment of the liquid crystal molecules, and a laser beam linearly-polarized in a direction inclined with respect to the polarization direction of the input beam may be outputted from the theta cell 24c. Accordingly, by setting the twisted angle of the alignment of the liquid crystal molecules in the theta cell 24c so as to differ in accordance with the azimuth angle direction, the theta cell 24c may convert a linearly-polarized input beam into a radially-polarized output beam.

However, when a linearly-polarized laser beam is converted into a radially-polarized laser beam only with the theta cell 24c, the beam intensity may be decreased at a boundary between an upper half and a lower half of the laser beam outputted from the theta cell 24c. Accordingly, a phase of the upper half of the laser beam may be shifted by n by the phase compensator 24a prior to the laser beam being incident on the theta cell 24c. In FIG. 30, the arrows indicate that the phases of the input beam are opposite between the upper and lower halves of the laser beam. The upper half of the phase compensator 24a may include a TN liquid crystal in which the alignment of the liquid crystal molecules is twisted by 180 degrees from the input side toward the output side. In this way, when a linearly-polarized laser beam in which the phases of the upper and lower halves are opposite is made to be incident on the theta cell 24c, laser beams of the same phase may be outputted around the boundary between the upper and lower halves of the output laser beam. With this, the beam intensity may be prevented from being decreased at the boundary between the upper and lower halves of the laser beam outputted from the theta cell 24c.

The polarization rotator 24b may be configured to rotate the polarization direction of the linearly-polarized input beam by 90 degrees. When a laser beam of which the polarization direction is rotated by 90 degrees is made to be incident on the theta cell 24c, the theta cell 24c may convert the linearly-polarized laser beam into an azimuthally-polarized laser beam. The polarization rotator 24b may be formed of a TN liquid crystal in which the alignment of the liquid crystal molecules is twisted by 90 degrees from the input side toward the output side. In this case, by controlling the DC voltage applied to the polarization rotator 24b so as to switch between a state where the alignment of the liquid crystal molecules are twisted and a state where the alignment is not twisted, switching between a radially-polarized output beam and an azimuthally-polarized output beam may be achieved.

In this way, the conversion of the polarization state may be achieved relatively freely by using the phase compensator 24a, the polarization rotator 24b, and the theta cell 24c. Further, as described with reference to FIGS. 27 through 29B, when the polarization direction is to be changed using a wave plate (phase plate), the wavelength of the laser beam of which the polarization direction is changed may differ depending on the thickness of the wave plate. However, as described with reference to FIG. 30, when the theta cell 24c is used, the polarization direction of an input beam of a relatively broad bandwidth may be changed. Accordingly, using the theta cell 24c may make it possible to change the polarization direction even when the bandwidth of the pre-pulse laser beam is broad.

11. Eighth Embodiment

Figure 31:
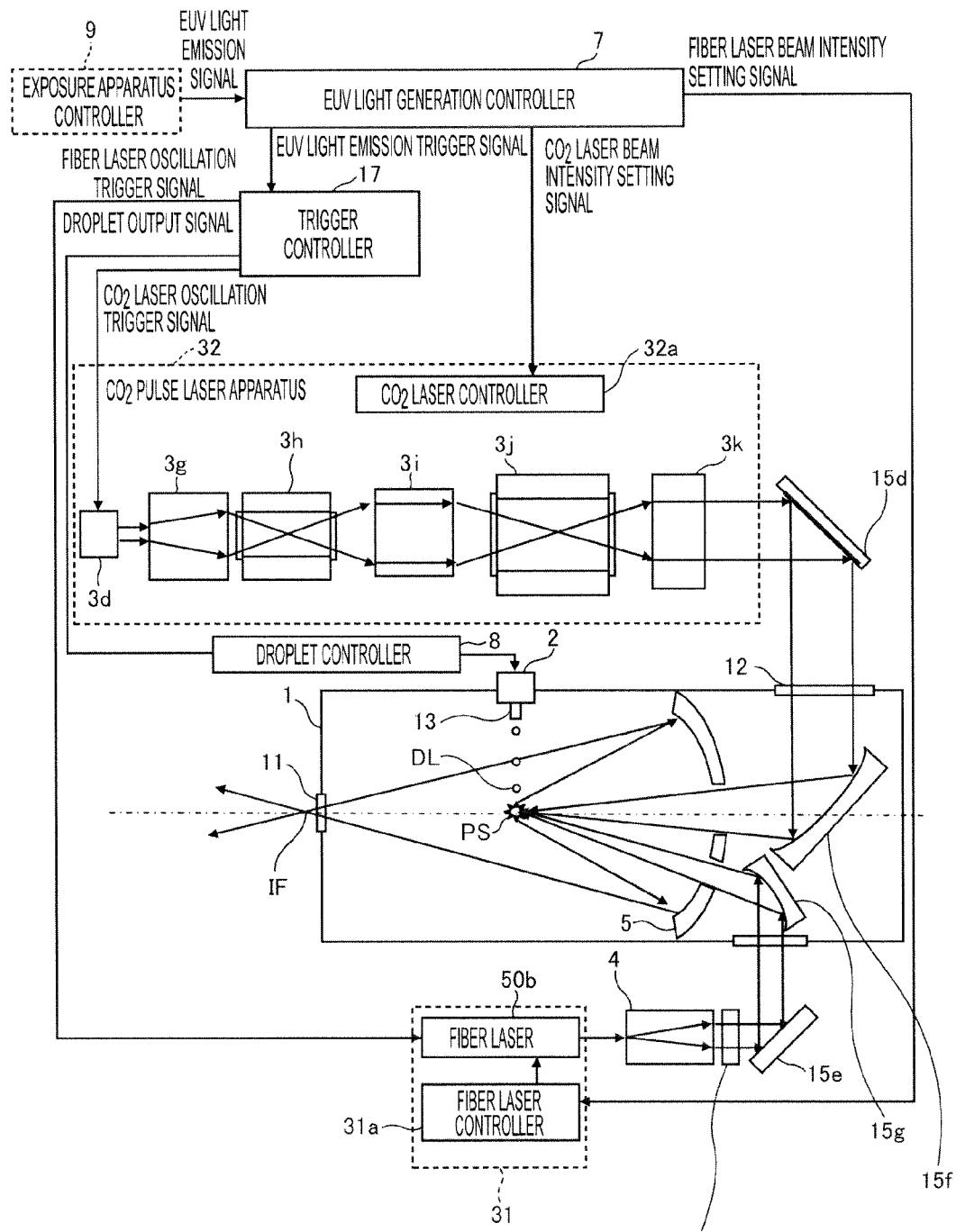
FIG. 31 schematically illustrates an exemplary configuration of an EUV light generation system according to an eighth embodiment.

FIG. 31 schematically illustrates the configuration of an EUV light generation system according to an eighth embodiment. In the EUV light generation system according to the eighth embodiment, the polarization state of a pre-pulse laser beam from the fiber laser apparatus 31 may be controlled by the polarization converter 20, and this pre-pulse laser beam may be guided into the chamber 1 along a beam path that is different from that of the main pulse laser beam.

12. Ninth Embodiment

Figures 32A, 32B, 32C:
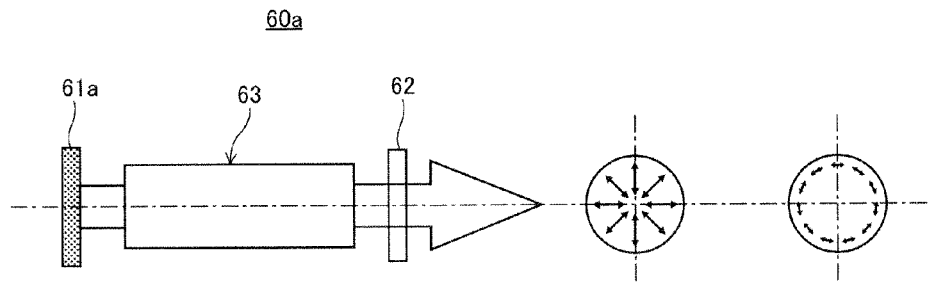
FIGS. 32A through 32C schematically illustrates an exemplary configuration of a laser apparatus configured to output a pre-pulse laser beam in an EUV light generation system according to a ninth embodiment.

FIGS. 32A through 32C schematically illustrates an exemplary configuration of a laser apparatus configured to output a pre-pulse laser beam in an EUV light generation system according to a ninth embodiment. A laser apparatus 60a of the ninth embodiment may be provided outside the chamber 1 (see, e.g., FIG. 1) as a driver laser for outputting a pre-pulse laser beam in any one of the first through fourth embodiments.

As shown in FIG. 32A, the laser apparatus 60a may include a laser resonator that includes a reflective polarization converter 61a and a front mirror 62. A laser medium 63 may be provided in the laser resonator. Stimulated emission light may be generated from the laser medium 63 with a pumping beam from a pumping source (not shown). The stimulated emission light may travel back and forth between the polarization converter 61a and the front mirror 62 and be amplified by the laser medium 63. Thereafter, an amplified laser beam may be outputted from the laser apparatus 60a.

The polarization converter 61a may be configured to reflect with high reflectance a laser beam of a predetermined polarization direction in accordance with the input position on the polarization converter 61a. In accordance with the reflective properties of the polarization converter 61a, a radially-polarized laser beam shown in FIG. 32B or an azimuthally-polarized laser beam shown in FIG. 32C may be amplified in the laser resonator. A part of the amplified laser beam may be transmitted through the front mirror 62 and outputted as the pre-pulse laser beam.

According to the ninth embodiment, a polarization converter may be used as a part of the resonator of the driver laser. With this, a polarization converter need not be provided in a beam path between the driver laser and the plasma generation region PS as in the seventh embodiment.

Figures 33A, 33B, 33C:
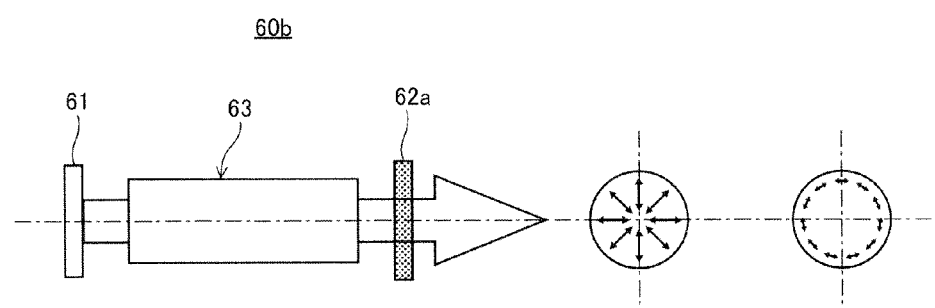
FIGS. 33A through 33C schematically illustrates an exemplary configuration of a laser apparatus configured to output a pre-pulse laser beam in an EUV light generation system according to a modification of the ninth embodiment.

FIGS. 33A through 33C schematically illustrates the exemplary configuration of a laser apparatus configured to output a pre-pulse laser beam in an EUV light generation system according to a modification of the ninth embodiment. A laser apparatus 60b of this modification may include a laser resonator that includes a rear mirror 61 and a reflective polarization converter 62a. In accordance with the reflective properties of the polarization converter 62a, a radially-polarized laser beam shown in FIG. 33B or an azimuthally-polarized laser beam shown in FIG. 33C may be amplified in the laser resonator. A part of the amplified laser beam may be transmitted through the polarization converter 62a and outputted as the pre-pulse laser beam.

Figure 34A:
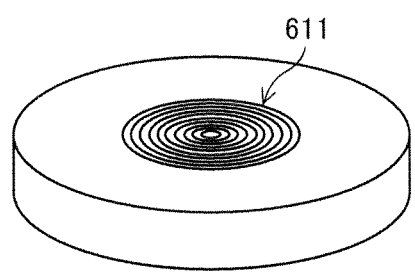
FIGS. 34A and 34B show an example of a polarization converter in the ninth embodiment.
Figure 34B:
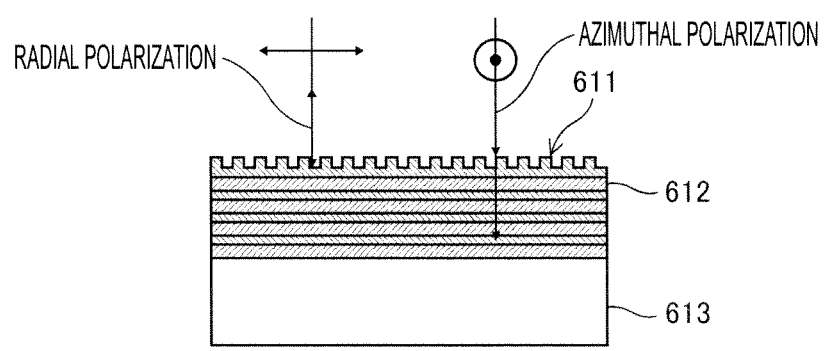

FIGS. 34A and 34B show an example of a polarization converter in the ninth embodiment. FIG. 34A is a perspective view of the polarizer, and FIG. 34B is an enlarged fragmentary sectional view of a diffraction grating portion of the polarization converter, taken along the radial direction plane. As shown in FIG. 34A, the reflective polarization converter 61a may be a mirror on which a concentric circular diffraction grating 611 is formed. Further, as shown in FIG. 34B, in the polarization converter 61a, a multilayer film 612 may be formed on a glass substrate 613, and the diffraction grating 611 may be formed on the multilayer film 612.

When an azimuthally-polarized laser beam is incident on the polarization converter 61a configured as such (here, the polarization direction is substantially parallel to the direction of the grooves in the diffraction grating 611), the azimuthally-polarized laser beam may be transmitted through the diffraction grating 611 and propagated to the multilayer film 612. On the other hand, when a radially-polarized laser beam is incident on the polarization converter 61a configured as such (here, the polarization direction is substantially perpendicular to the direction of the grooves in the diffraction grating 611), the radially-polarized laser beam may not be transmitted through the diffraction grating 611 and may be reflected thereby. In the ninth embodiment (see FIGS. 32A through 32C), using the polarization converter 61a configured as such in the laser resonator may make it possible to output a radially-polarized laser beam.

Here, when the grooves in the diffraction grating 611 are formed radially, the polarization converter 61a may reflect an azimuthally-polarized laser beam with high reflectance. In this case, the azimuthally-polarized laser beam may be outputted. Further, forming the diffraction grating 611 on the polarization converter 62a of the modification (see FIGS. 33A through 33C) of the ninth embodiment may make it possible to output a radially-polarized laser beam or an azimuthally-polarized laser beam.

13. Control of Fluence

Figure 35:
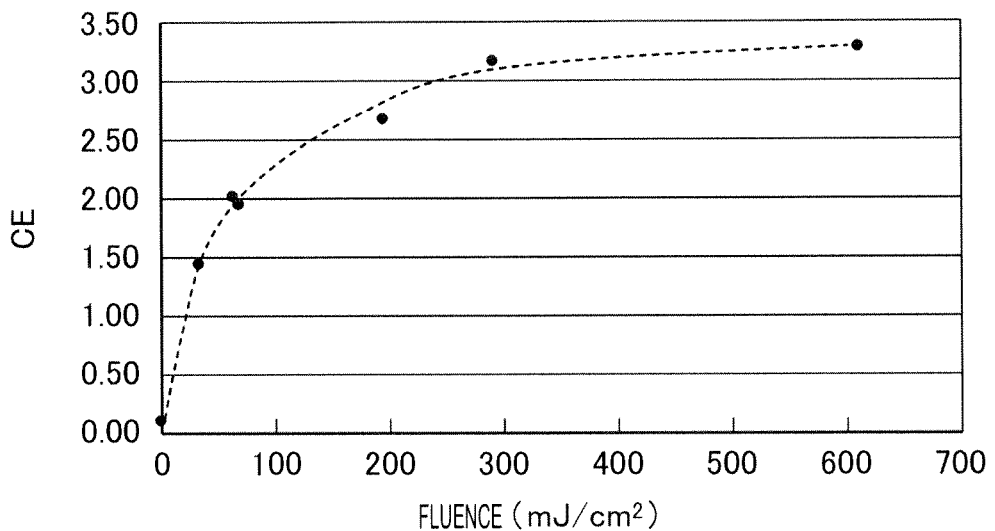
FIG. 35 is a graph on which the obtained conversion efficiency (CE) in accordance with a fluence of a pre-pulse laser beam is plotted.

FIG. 35 is a graph on which the obtained conversion efficiency (CE) in accordance with a fluence (energy per unit area of a beam cross-section at its focus) of a pre-pulse laser beam is plotted.

The measuring conditions are as follows. A molten tin droplet having a diameter of 20 μm is used as a target material. A laser beam with a pulse duration of 5 ns to 15 ns outputted from a YAG pulse laser apparatus is used as a pre-pulse laser beam. A laser beam with a pulse duration of 20 ns outputted from a $CO_2$ pulse laser apparatus is used as a main pulse laser beam. The beam intensity of the main pulse laser beam is $6.0 \times 10^9$ W/cm$^2$, and the delay time for the irradiation with the main pulse laser beam is 1.5 μs after the irradiation with the pre-pulse laser beam.

The horizontal axis of the graph shown in FIG. 35 shows a value in which the irradiation conditions of the pre-pulse laser beam (pulse duration, energy, spot size) are converted into a fluence. Further, the vertical axis shows the CE in the case where the diffused target generated in accordance with the irradiation conditions of the pre-pulse laser beam is irradiated with the above main pulse laser beam.

The measurement results shown in FIG. 35 reveal that increasing the fluence of the pre-pulse laser beam may improve the CE (approximately 3%). That is, at least in a range where the pulse duration of the pre-pulse laser beam is 5 ns to 15 ns, there is a correlation between the fluence and the CE.

Accordingly, in the above embodiments, the EUV light generation controller 7 may be configured to control the fluence, instead of the beam intensity, of the pre-pulse laser beam. The measurement results shown in FIG. 35 reveal that the fluence of the pre-pulse laser beam may preferably be in the range of 10 mJ/cm$^2$ to 600 mJ/cm$^2$. The range of 30 mJ/cm$^2$ to 400 mJ/cm$^2$ is more preferable. The range of 150 mJ/cm$^2$ to 300 mJ/cm$^2$ is even more preferable.

From the measurement results where the CE is improved when the fluence of the pre-pulse laser beam is controlled as above, it is speculated that a droplet is diffused in a disc-shape, a dish-shape, or a torus-shape under the above conditions. That is, it is speculated that when a droplet is diffused, the total surface area is increased, the energy of the main pulse laser beam is absorbed efficiently by the diffused target, and as a result, the CE is improved.

14. Control of Delay Time

Figure 36:
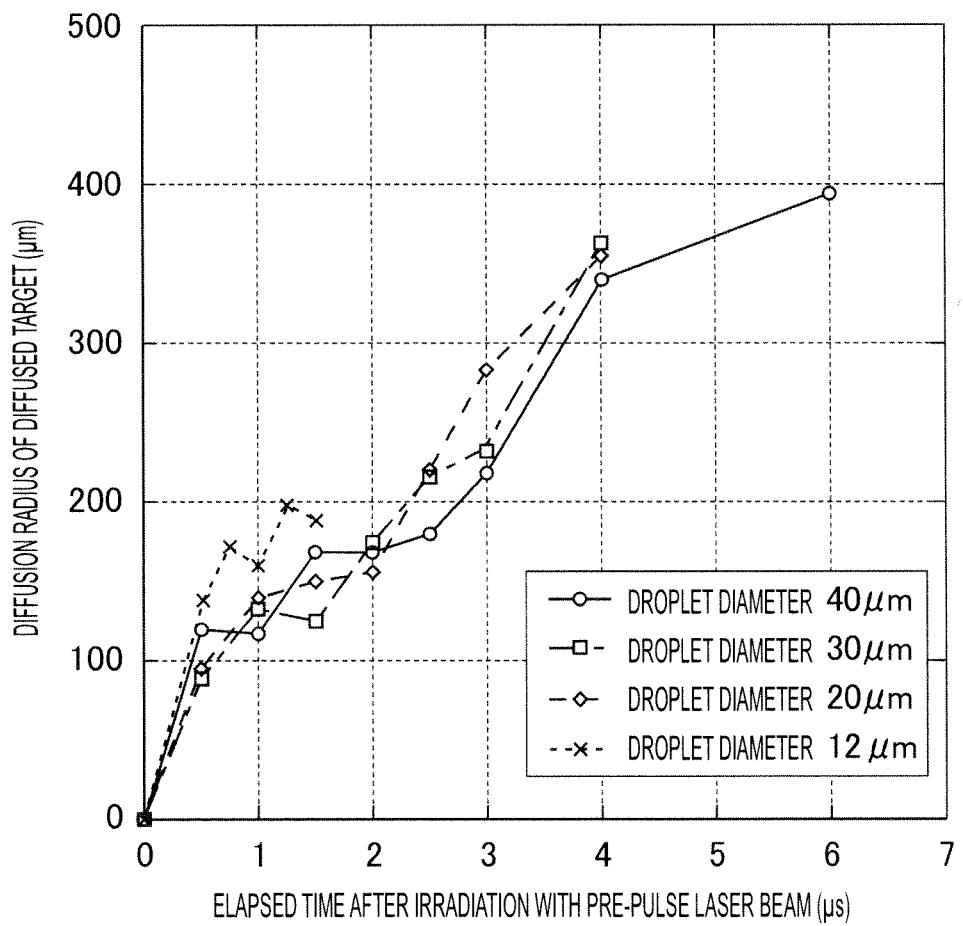
FIG. 36 is a graph showing the result of an experiment for generating a diffused target in an EUV light generation system.

FIG. 36 is a graph showing the result of an experiment for generating a diffused target in an EUV light generation system. In this experiment, the EUV light generation system of the eighth embodiment is used. The pre-pulse laser beam may be converted into a circularly-polarized laser beam by the polarization converter 20. The horizontal axis in FIG. 36 shows a time that has elapsed since a droplet is irradiated with a pre-pulse laser beam. The vertical axis shows a diffusion radius of a diffused target generated when the droplet is irradiated with the pre-pulse laser beam. The diffusion radius is a radius of a space where a particle of a predetermined diameter exists. Changes over time in the diffusion radius after the irradiation with the pre-pulse laser beam are plotted for the droplets respectively having diameters of 12 μm, 20 μm, 30 μm, and 40 μm. As seen from FIG. 36, the diffusion radius has low dependency on the droplet diameter. Further, the changes over time in the diffusion radius are relatively gradual in 0.3 μs to 3 μs after a droplet is irradiated with a pre-pulse laser beam. It is speculated that the variation in the diffusion radius for each droplet is small during this time period. Accordingly, if the diffused target is irradiated with a main pulse laser beam during this time period, the variation in generated EUV energy may be small between pulses.

Figure 37:
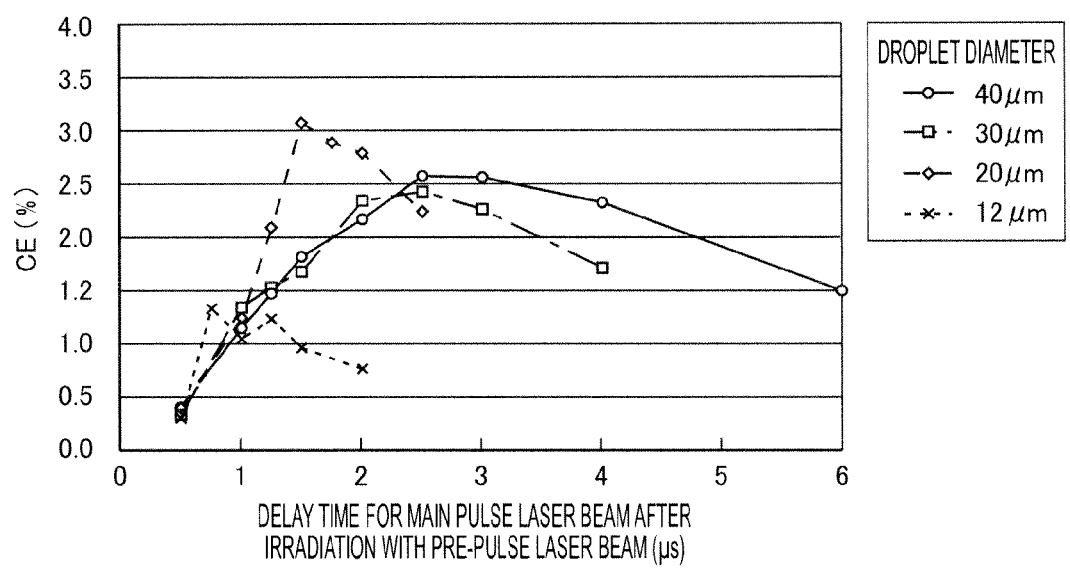
FIG. 37 is a graph on which the obtained conversion efficiency (CE) for the corresponding delay time since a droplet is irradiated with a pre-pulse laser beam until a diffused target is irradiated by a main pulse laser beam is plotted for differing diameters of the droplet.

FIG. 37 is a graph on which the obtained conversion efficiency (CE) for the corresponding delay time since a droplet is irradiated with a pre-pulse laser beam until a diffused target is irradiated by a main pulse laser beam is plotted for differing diameters of the droplet.

The measuring conditions are as follows. Molten tin droplets respectively having diameters of 12 μm, 20 μm, 30 μm, and 40 μm are used as the target material. A laser beam with a pulse duration of 5 ns outputted from a YAG pulse laser apparatus is used as a pre-pulse laser beam. The fluence of the pre-pulse laser beam is 490 mJ/cm². A laser beam with a pulse duration of 20 ns outputted from a $CO_2$ pulse laser apparatus is used as a main pulse laser beam. The beam intensity of the main pulse laser beam is $6.0 \times 10^9$ W/cm².

The measurement results shown in FIG. 37 reveal that the delay time for the irradiation with the main pulse laser beam may preferably be in a range of 0.5 µs to 2.5 µs after the irradiation with the pre-pulse laser beam. However, it is found that the optimum range of the delay time for the irradiation with the main pulse laser beam to obtain a high CE differs depending on the diameter of the droplet.

When the diameter of the droplet is 12 µm, the delay time for the irradiation with the main pulse laser beam may preferably be in a range of 0.5 µs to 2 µs after the irradiation with the pre-pulse laser beam. The range of 0.6 µs to 1.5 µs is more preferable. The range of 0.7 µs to 1 µs is even more preferable.

When the diameter of the droplet is 20 µm, the delay time for the irradiation with the main pulse laser beam may preferably be in a range of 0.5 µs to 2.5 µs after the irradiation with the pre-pulse laser beam. The range of 1 µs to 2 µs is more preferable. The range of 1.3 µs to 1.7 µs is even more preferable.

When the diameter of the droplet is 30 µm, the delay time for the irradiation with the main pulse laser beam may preferably be in a range of 0.5 µs to 4 µs after the irradiation with the pre-pulse laser beam. The range of 1.5 µs to 3.5 µs is more preferable. The range of 2 µs to 3 µs is even more preferable.

When the diameter of the droplet is 40 µm, the delay time for the irradiation with the main pulse laser beam may preferably be in a range of 0.5 µs to 6 µs after the irradiation with the pre-pulse laser beam. The range of 1.5 µs to 5 µs is more preferable. The range of 2 µs to 4 µs is even more preferable.

In the above description, the driver laser 3 (see FIG. 1) corresponds to a laser beam generation apparatus configured to output a pre-pulse laser beam and a main pulse laser beam. The YAG pulse laser apparatus 3a (see FIGS. 9 through 11) and the fiber laser apparatus 31 (see FIGS. 18 and 31) correspond to a first pulse laser apparatus. The $CO_2$ pulse laser apparatus 3b (see FIGS. 9 through 11) and the $CO_2$ pulse laser apparatus 32 (see FIGS. 18 and 31) correspond to a second pulse laser apparatus. The EUV light generation controller 7 (see FIG. 1) corresponds to a laser controller.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A system comprising:
a target supply unit configured to supply a target material for generating extreme ultraviolet light;
a first laser apparatus configured to generate a first pre-pulse laser beam with which the target material is irradiated, the first pre-pulse laser beam having a pulse width of 1 ns or less and having a pulse energy of 0.15 mJ or less;
a second laser apparatus configured to generate a second pre-pulse laser beam with which the target material irradiated with the first pre-pulse laser beam is irradiated;
a third laser apparatus configured to generate a main pulse laser beam with which the target material irradiated with the second pre-pulse laser beam is irradiated;
a first beam combiner configured to coincide a first optical path of the first pre-pulse laser beam and a second optical path of the second pre-pulse laser beam with each other to be a third optical path, and output the first and second pre-pulse laser beams, respectively, along the third optical path; and
a second beam combiner configured to coincide the third optical path of the first and second pre-pulse laser beams output from the first beam combiner and a fourth optical path of the main pulse laser beam with each other.

2. The system according to claim 1, wherein
the first and second laser apparatuses are configured to generate laser beams each having a first wavelength, and
the third laser apparatus is configured to generate a laser beam having a second wavelength longer than the first wavelength.

3. The system according to claim 1, wherein
the first laser apparatus is a first YAG laser apparatus;
the second laser apparatus is a second YAG laser apparatus; and
the third laser apparatus is a $CO_2$ laser apparatus.

4. The system according to claim 1, wherein the first laser apparatus is a fiber laser apparatus.

5. The system according to claim 1, wherein the first pre-pulse laser beam has a fluence in a range of 10 mJ/cm² to 500 mJ/cm².

6. The system according to claim 5, wherein the target material is irradiated with the main pulse laser beam at a delay time in a range of 0.5 µs to 2.5 µs after the target material is irradiated with the first pre-pulse laser beam.

7. The system according to claim 6, wherein:
the first beam combiner is disposed at an intersection of the first optical path of the first pre-pulse laser beam and the second optical path of the second pre-pulse laser beam, a first direction of the first optical path and a second direction of the second optical path being different from each other, the first beam combiner being configured to output the first and second pre-pulse laser beams, respectively, substantially in the same direction with each other along the third optical path; and
the second beam combiner is disposed at an intersection of the third optical path of the first and second pre-pulse laser beams output from the first beam combiner and a fourth optical path of the main pulse laser beam, a third direction of the third optical path and a fourth direction of the fourth optical path being different from each other, and the second beam combiner being configured to output the first and second pre-pulse laser beams and the main pulse laser beam, respectively, substantially in the same direction with each other.

8. The system according to claim 7, wherein:
the first and second laser apparatuses are configured to generate laser beams each having a first wavelength, and
the third laser apparatus is configured to generate a laser beam having a second wavelength longer than the first wavelength.

9. The system according to claim 8, wherein
the first laser apparatus is a first YAG laser apparatus;
the second laser apparatus is a second YAG laser apparatus; and
the third laser apparatus is a $CO_2$ laser apparatus.

10. The system according to claim 7, wherein
the first laser apparatus is a first YAG laser apparatus;
the second laser apparatus is a second YAG laser apparatus; and
the third laser apparatus is a $CO_2$ laser apparatus.

11. The system according to claim 10, wherein:
the first and second laser apparatuses are configured to generate laser beams each having a first wavelength, and
the third laser apparatus is configured to generate a laser beam having a second wavelength longer than the first wavelength.

12. The system according to claim 7, wherein the first laser apparatus is a fiber laser apparatus.

13. The system according to claim 12, wherein:
the first and second laser apparatuses are configured to generate laser beams each having a first wavelength, and
the third laser apparatus is configured to generate a laser beam having a second wavelength longer than the first wavelength.

14. The system according to claim 13, wherein
the first laser apparatus is a first YAG laser apparatus;
the second laser apparatus is a second YAG laser apparatus; and
the third laser apparatus is a $CO_2$ laser apparatus.

15. The system according to claim 12, wherein
the first laser apparatus is a first YAG laser apparatus;
the second laser apparatus is a second YAG laser apparatus; and
the third laser apparatus is a $CO_2$ laser apparatus.

16. The system according to claim 15, wherein:
the first and second laser apparatuses are configured to generate laser beams each having a first wavelength, and
the third laser apparatus is configured to generate a laser beam having a second wavelength longer than the first wavelength.

* * * * *